(12) United States Patent
Takada et al.

(10) Patent No.: US 6,937,676 B2
(45) Date of Patent: Aug. 30, 2005

(54) INTERFERENCE-SIGNAL REMOVING APPARATUS

(75) Inventors: Masatoshi Takada, Tokyo (JP); Yoichi Murakami, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 754 days.

(21) Appl. No.: 09/960,377

(22) Filed: Sep. 24, 2001

(65) Prior Publication Data

US 2002/0071508 A1 Jun. 13, 2002

(30) Foreign Application Priority Data

Oct. 27, 2000 (JP) .................................... 2000-328437
Oct. 27, 2000 (JP) .................................... 2000-328740

(51) Int. Cl.[7] .................................................. H04B 1/10
(52) U.S. Cl. ...................................... 375/346; 455/143
(58) Field of Search ............................... 375/229, 285; 370/201, 208; 381/71.1, 71.13; 455/143, 74

(56) References Cited

U.S. PATENT DOCUMENTS

| 4,613,978 | A |   | 9/1986  | Kurth et al.           |
| 5,047,736 | A | * | 9/1991  | Ghose ............... 333/12 |
| 5,168,508 | A |   | 12/1992 | Iwasaki et al.         |
| 5,271,038 | A |   | 12/1993 | Cai                    |
| 5,687,162 | A | * | 11/1997 | Yoshida et al. ........... 370/203 |
| 5,832,032 | A | * | 11/1998 | Overbury ................ 375/285 |
| 5,974,101 | A |   | 10/1999 | Nago                   |
| 6,118,805 | A | * | 9/2000  | Bergstrom et al. ........ 375/132 |
| 6,810,124 | B1| * | 10/2004 | White .................. 381/71.1 |
| 2002/0155812 | A1 | * | 10/2002 | Takada ............... 455/63 |
| 2002/0196876 | A1 | * | 12/2002 | Takada ............... 375/346 |

FOREIGN PATENT DOCUMENTS

| WO | 00/25436 | 5/2000 |
| WO | 01/50622 | 7/2001 |

* cited by examiner

*Primary Examiner*—Stephen Chin
*Assistant Examiner*—Jaison Joseph
(74) *Attorney, Agent, or Firm*—Wenderoth, Lind & Ponack, L.L.P.

(57) ABSTRACT

An interference-signal removing apparatus is provided for removing narrow-band interference signals from input signals including wide-band desired signals and the narrow-band interference signals, which suppresses that even desired signals are removed. The interference-signal removing apparatus includes an extraction section for extracting interference signals from input signals, a removal circuit for removing extracted interference signals from input signals, an extraction control section for controlling extraction of interference signals by the extraction section in accordance with the removal result, and an extraction-amount suppression section for suppressing the interference signal amount to be extracted in accordance with input signals.

28 Claims, 20 Drawing Sheets

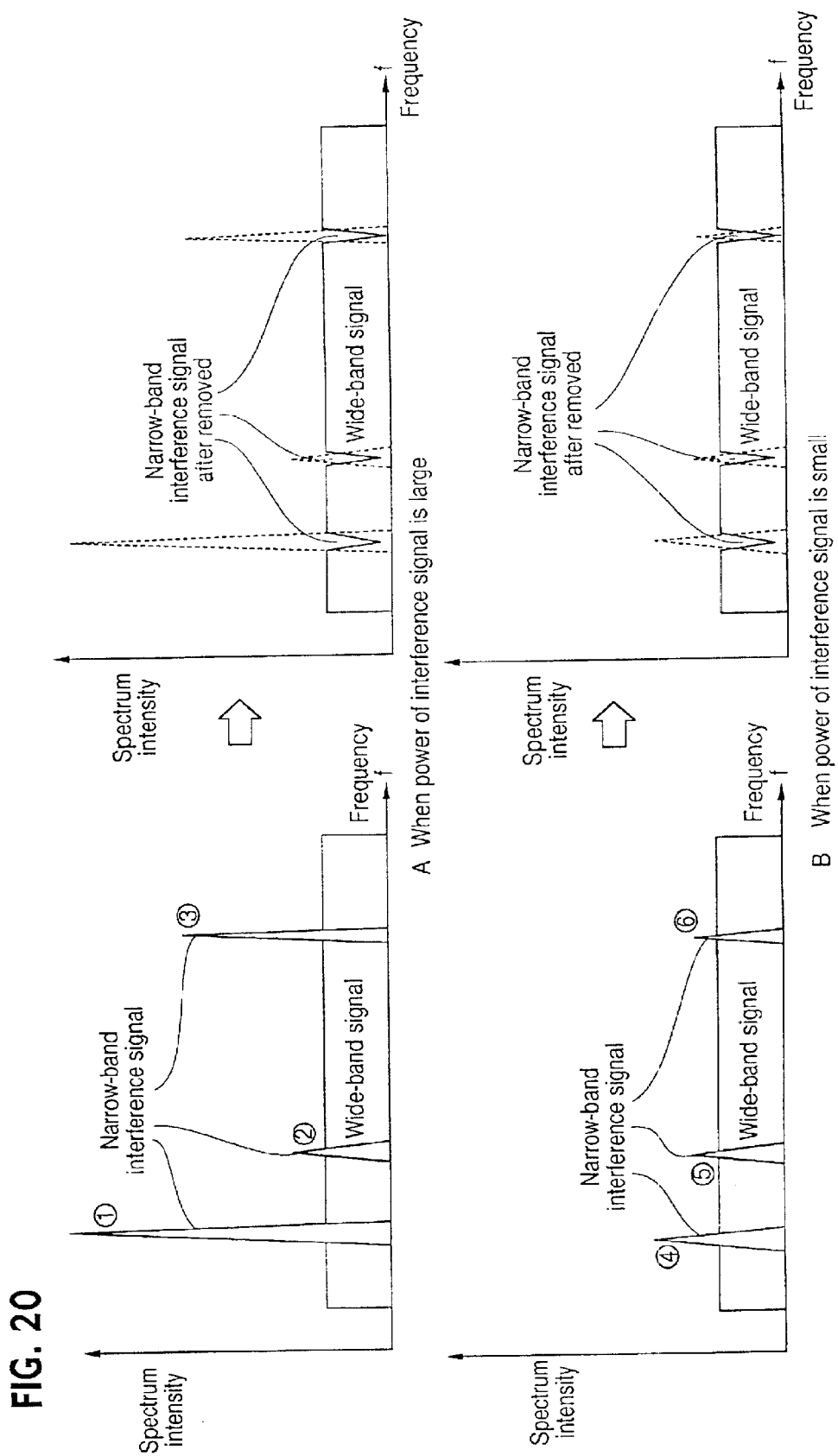

INTERFERENCE-SIGNAL REMOVING APPARATUS

BACKGROUND OF THE INVENTION

1. Field of the Invention

The present invention relates to an interference signal removing apparatus for removing narrow-band interference signals from input signals including wide-band desired signals and the narrow-band interference signals, and particularly to an interference-signal removing apparatus improved in suppressing that up to a desired signal is removed.

2. Description of the Prior Art

For example, reception signals received by a receiver may include a signal that should be received (desired signal) and a signal interfering with the desired signal (interference signal).

First, a wide-band desired signal and a narrow-band interference signal are described below by using radio LAN of IEEE 802.11 as an example.

The terms "wide band" and "narrow band" are used as relative meanings. Specifically, a signal having a sufficiently-large occupying band width compared to the occupying band width of a narrow-band interference signal is referred to as a wide-band signal and a signal having an occupying band width 10 times larger than the occupying band width of, for example, a narrow-band interference signal is referred to as a wide-band signal. As an example, in the case of the radio LAN described below, a wide-band signal has an occupying band with of, for example, 26 MHz (frequency per wave) and a narrow-band signal has an occupying band width of, for example, 2 MHz (frequency per wave).

The radio LAN of IEEE 802.11 roughly uses a direct diffusion (DSSS: Direct Sequence Spread Spectrum) system and a frequency hopping (FHSS: Frequency Hopping Spread Spectrum) system. In accordance with the difference between these modulated waves, it is possible to regard a signal according to the DSSS mode as a wide-band signal and a signal according to the FHSS mode as a narrow-band signal. Moreover, both systems perform radio communication by using the same frequency band and systematically allow mutual interference. Therefore, it is a matter of course that interference occurs between signals according to both systems.

In this case, the DSSS mode is a system for communicating (transmitting) a narrow-band signal as a wide-band signal through frequency diffusion and returning the signal to the original narrow-band signal in the demodulation process at the reception side. Therefore, the DSSS mode makes it possible to suppress a narrow-band signal included in a reception signal because the narrow-band signal is diffused to a wide-band signal in the demodulation process. A ratio before or after the above diffusion is referred to as a diffusion coefficient. For example, when the diffusion coefficient is equal to 128, a gain of approx. 21 dB (accurately, 10LOG128) is obtained.

The FHSS mode is a system for communicating a narrow-band signal by changing transmission frequencies of the signal every specific time and thereby using a wide band. Therefore, the FHSS mode makes it possible to suppress the influence of interference by a reception filter of a receiver using the FHSS mode because an occupying band width when fixing a specific time becomes as narrow as 2 MHz and the power per band concerned according to the DSSS mode relatively decreases.

Moreover, in the case of the FHSS mode, even while another transmitter communicates a signal in accordance with the FHSS mode using a different hopping pattern, the probability of using the same frequency at the same time is low. Therefore, the interference between the transmitters does not almost matter. Moreover, the FHSS mode allows frequency hopping by using a wide band compared to the case of the DSSS mode. Therefore, even if a strong interference occurs in the DSSS mode, it is possible to receive a signal in accordance with a frequency band free from interference.

In the case of the DSSS mode, however, a diffusion coefficient may be lowered in order to raise a signal transmission rate. Specifically, when the diffusion coefficient is lowered to 11, a gain is lowered approx. 10 dB (accurately, 10LOG11), moreover the gain is further lowered when the diffusion coefficient is lowered to less than 11, and the suppression effect of an interference signal may not be obtained.

Moreover, the probability that a signal according to the DSSS mode receives interference is raised because it has been started to widely use a standard such as Bluetooth (short-range mobile service) using, for example, the FHSS mode as the radio interface between portable units.

Furthermore, as another example, it is considered that an interference in an adjacent frequency band occurs between a communication signal according to the W-CDMA (Wideband-Code Division Multiple Access) mode and a communication signal according to the PHS (Personal Handyphone System) mode, an interference occurs between a wide-band signal of 2.4-GHz-band radio LAN (IEEE 80.2 11) and a narrow-band signal of Bluetooth, or an interference occurs between a CDMA-mode communication signal and a TDMA(Time Division Multiple Access)-mode or FDMA (Frequency Division Multiple Access)-mode communication signal due to common use of a frequency band or an interference with an unexpected external wave.

As an art for removing the above interference, the following methods have been studied so far: an interference-signal removing method using an adaptive algorithm and an interference-signal moving method using a notch filter. As an example, an art for removing a narrow-band signal interfering with a wide-band signal by a notch filter using a multi-rate filter bank is described in "Application of complex multi-rate filter bank to DS-CDMA/TDMA-signal bundling receiver sharing frequency band (Thesis journal of Institute of Electronics, Information, and Communication Engineers B-11, Vol. J80-B11, No. 12, December, 1997)". However, this art also removes the component of a wide-band signal that is a desired wave when removing a narrow-band signal by a filter. Therefore, a problem occurs that a bit error ratio after removing an interference wave is deteriorated.

Next, a conventional interference-signal removing apparatus is described below. The interference-signal removing apparatus is set to, for example, a receiver for performing radio communication to remove an interference signal included in a signal received from the receiver.

FIG. 8 shows an interference-signal removing apparatus which is provided with an interference-signal extraction section 51, a synthesizer 52, and an interference-signal estimation section 53. In this case, symbol t denotes time.

The interference-signal estimation section 53 inputs a reception signal r(t) in which a wide-band desired signal and a plurality of narrow-band interference signals are synthesized and a reception signal e(t) after interference is removed, estimates an interference signal included in the reception signal r(t) by using a general adaptive algorithm, and outputs an interference-signal estimation coefficient h(t+1) according to the estimation result to the interference-signal extraction section 51.

The interference-signal extraction section 51 inputs a reception signal r(t), extracts a signal V(t) regarded as an interference signal from the reception signal r(t) in accordance with the interference-signal estimation coefficient h(t+1) input from the interference-signal estimation section 53, and outputs the interference signal V(t) to the synthesizer 52.

The synthesizer 52 synthesizes the reception signal r(t) with the interference signal V(t) output from the interference-signal extraction section 51 in an opposite phase (that is, so that the interference signal V(t) is removed from the reception signal r(t)) and outputs a reception signal e(t) in which the interference signal V(t) is removed. A part of the reception signal e(t) from which interference is removed output from the synthesizer 52 is input to the interference-signal estimation section 53 and used to estimate an interference signal.

Next, examples of CDMA mode and interference-signal removing apparatuses according to the CDMA mode are described below.

For example, a mobile communication system using the DS-CDMA mode realizes multiplex communication between a plurality of mobile station systems and a base station system by assigning different diffusion codes to the mobile station systems. Specifically, each mobile-station system diffuses, modulates, and transmits a signal to be transmitted by a diffusion code assigned to its own system while the base-station system demodulates a signal sent from a desired mobile-station system by inversely diffusing a reception signal by using a diffusion code assigned to each mobile-station system. Moreover, a mobile-station system demodulates a signal addressed to its own system by inversely diffusing a signal received from the base-station system by a diffusion code assigned to its own system.

FIG. 9 shows a diffusion-code series constituted of, for example, a PN (pseudo-noise signal) series.

As shown in FIG. 9, a diffusion signal of one unit (for one symbol) is constituted of a plurality of chip data values (e.g. string of values "1" and "−1") and it is possible to generate a plurality of different diffusion codes by making patterns of chip-data-value strings different from each other. In this case, a diffusion code has a characteristic that by shifting a certain diffusion code up to one chip time or more, the correlation with this diffusion code disappears.

Moreover, FIG. 9 shows the time width of one chip data (chip interval Tc) and the time width of a diffusion code for one symbol (bit interval T). In this case, the time width of a diffusion code for one symbol corresponds to the time width of transmission data (e.g. values "1" and "0") to be transmitted to a receiver (e.g. base-station system or mobile-station system) from a transmitter (e.g. mobile-station system or base-station system). That is, the change speed of chip data constituting a diffusion code is very high compared to the switching speed (symbol switching speed) of transmission data to be diffused and modulated by the diffusion code.

As described above, in the case of this type of radio communication, a different narrow-band signal (that is, signal according a mode other than the CDMA mode) is unexpectedly added into a wide frequency band used for the communication for which use of a frequency is permitted to cause an interference in some cases. When the above interference signal is larger than the degree of a disturbance due to noises estimated when a system is designed, the number of bit errors increases and the reception quality of a receiver is extremely deteriorated.

Moreover, as described above, it is also considered to realize multiplex communication in accordance with a mode for performing communication by using a comparatively-wide frequency band such as the CDMA mode and a mode for performing communication by using a narrow band such as the FM (Frequency Modulation) mode in order to effective use a frequency band. Specifically, it is principally possible to effectively use a frequency band by multiplexing a signal according to the analog communication mode such as the FM mode to the frequency band of a diffusion signal according to the CDMA mode. However, if a CDMA receiver cannot remove a signal according to the FM mode from a reception signal, the signal interferes with a diffusion signal and thereby, the number of bit errors increases and the reception quality is deteriorated.

FIG. 10 shows spectrums of reception signals including diffusion signals according to the CDMA mode (CDMA signal) and a signal according to the FM mode (FM interference wave), in which the abscissa indicates frequency and the ordinate indicates spectrum intensity.

The interference-signal removing apparatus (interference removing circuit) disclosed in the official gazette of Japanese Patent Application No. 11-197296 is described below by referring to FIGS. 11 to 15. The interference-signal removing apparatus disclosed in the official gazette is set to a base-station system, a mobile-station system, or a relay-station system using the CDMA mode to remove narrow-band interference signals from reception signals including wide-band diffusion signals diffused and modulated in accordance with the CDMA mode and the narrow-band interference signals or I and Q components of the reception signal, particularly removes the interference signal by using the characteristic of the diffusion signal.

FIG. 11 shows an interference-signal removing apparatus for removing an FM signal (interference signal) from the input signal r(t) by inputting reception signals including a CDMA signal (desired signal) and the FM signal. In the case of the interference-signal removing apparatus, to remove interference signals from reception signals including diffusion signals diffused and modulated in accordance with the CDMA mode and the interference signals, time-difference means 61 gives a time difference for one chip of a diffusion code or more between two signals obtained by distributing reception signals, extraction means 62 and 64 extract signal components having a correlation between the two signals provided with the time difference as interference-signal components, and removal means 63 removes the extracted interference-signal components from the reception signal.

Specifically, the interference removing apparatus shown in FIG. 11 is provided with a delay element 61 for delaying a reception signal, an adaptive filter 62 for extracting interference-signal components from the delayed reception signal in accordance with a tap-coefficient control signal output from a filter-tap-operation control section 64 to be described later, a subtracter 63 for removing the interference-signal components from the reception signal, and a filter-tap-coefficient-operation control section 64 for outputting a tap-coefficient control signal according to a signal output from the subtracter 63 and the delayed reception signal to the adaptive filter 62.

The configuration and operations of the circuit shown in FIG. 11 are described below.

The signal r(t) received from the receiver is input to the circuit, which includes a diffusion signal diffused and modulated in accordance with the CDMA mode and an interference signal (such as an FM signal) according to a communication mode using a narrow band. In this case, t indicates time, which is assumed as an integral discrete value using one sample time as the minimum unit in the case of this embodiment.

The above input signal r(t) is first divided into two signals, and one signal is input to the delay element 61 and the other signal is input to the subtracter 63.

The delay element 61 has a function for delaying an input signal for the time width for one chip of a diffusion signal or more and outputting the signal. The time difference is preset to a value capable of eliminating the correlative component of the diffusion signal between the above two signals and leaving the correlative component of an interference signal to be removed.

Specifically, a signal output from the delay element 61 is shown as r(t−τ). In this case, τ denotes a delay time output from the delay element 61.

The signal (t−τ) output from the delay element 61 is input to the adaptive filter 62 and filter-tap-coefficient-operation control section 64.

FIG. 12 shows a configuration of the adaptive filter 62.

The adaptive filter 62 shown in FIG. 12 is provided with a shift register constituted of (n−1) storage elements S1 to Sn-1 arranged in series, n multipliers J1 to Jn, and (n-1) adders K1 to Kn-1. In this case, symbol n denotes the number of filter taps.

A signal r(t−τ) output from the delay element 61 is input to the shift register and stored in the storage elements S1 to Sn-1 in time series. Moreover, a signal stored in each of the storage elements S1 to Sn-1 is successively shifted to the following storage element.

Specifically, the series u(t) of the signal r(t−τ) input to the shift register in the shift register is shown by the following expression (1). In the expression (1), u(t) denotes a vector.

In this specification, when a symbol used to show a signal or the like does not show a vector or matrix, the symbol is assumed as scalar.

[Numerical Formula 1]

$$u(t)=\{r1, r2, r3, \ldots, rn\}$$

$$rx=r(t-\tau-x+1) \quad \text{(Expression 1)}$$

In this case, a signal r1 is a signal to be input to the shift register at a certain time and output to the multiplier J1 without passing through any one of the storage elements S1 to Sn-1. Moreover, signals r2 to rn are signals to be output from the storage elements S1 to Sn-1 at the time concerned and output to the multipliers J2 to Jn.

The above signals r1 to rn are input to the multipliers J1 and Jn and moreover tape-coefficient control signals h1 to hn are input to the multipliers J1 to Jn from a filter-tap-coefficient-operation control section 64 to be described later one to one. The multipliers J1 to Jn multiply two input signals (that is, weight the signals r1 to rn with the tap-coefficient control signals h1 to hn) and output the multiplication results to the adders K1 to Kn.

In this case, a filter-tap-coefficient series h(t) output from the filter-tap-coefficient-operation control section 64 is shown by the following expression (2). In this case, h(t) denotes a vector.

[Numerical Formula 2]

$$h(t)=\{h1, h2, h3, \ldots, hn\} \quad \text{(Expression 2)}$$

Moreover, multiplication results output from the multipliers J1 to Jn are totaled by the adders K1 to Kn and the totaled result is output from the adaptive filter 62. In this case, as described later, the filter-tap-coefficient series h(t) of this embodiment is updated one after another by the filter-tap-coefficient-operation control section 64 so that the totaled result becomes the same signal as the interference-signal component included in a reception signal.

Specifically, a signal output from the adaptive filter 62 (that is, the above totaled result) FM(t) is shown by the following expression (3). In this case, Σ in the expression (3) denotes a sum.

[Numerical Formula 3]

$$FM(t)=h(t)*u(t)=\Sigma(hi*ri)(i=1, 2, \ldots, n) \quad \text{(Expression 3)}$$

A symbol "*" used for this specification denotes the multiplication between symbols arranged before and after the symbol "*". Particularly, the multiplication between vectors shows the operation for calculating the inner product of two vectors.

As described above, the adaptive filter 62 extracts the above interference signal component from the input delay signal r(t−τ) in accordance with a tap-coefficient control signal output from the filter-tap-coefficient-operation control section 64 and outputs the component to the subtracter 63 as an interference-wave extraction signal FM(t).

The subtracter 63 has a function for inputting the not-delayed input signal r(t) and the signal FM(t) output from the adaptive filter 62, subtracting the output signal FM(t) from the input signal r(t), and outputting the subtraction result e(t).

In this case, the above subtraction result e(t) is a signal output from the interference-signal removing apparatus of this embodiment, which is shown by the following expression (4).

[Numerical Formula 4]

$$e(t)=r(t)-FM(t) \quad \text{(Expression 4)}$$

In the case of this embodiment, tap-coefficient control signals output from the filter-tap-coefficient-operation control section 64 to be described later are updated one after another and thereby, the above interference-wave extraction signal FM(t) becomes the same signal as an interference signal in a reception signal. Therefore, the above subtraction result e(t) becomes a signal obtained by removing the interference signal from the reception signal, that is, a diffusion signal according to the CDMA mode (ideally, only the diffusion signal).

The filter-tap-coefficient-operation control section 64 has a function for receiving the signal r(t−τ) output from the delay element 61 and the signal e(t) output from the subtracter 63, computing a tap-coefficient in which the signal FM(t) output from the adaptive filter 62 becomes a signal same as an interference-signal component by using the signals r(t−τ) and e(t), and outputting the operated tap-coefficient control signal to the adaptive filter 62.

The filter-tap-coefficient-operation control section 64 of this embodiment can compute the above tap-coefficient control signal by using an algorithm such as LMS (Least Means Square) or RLS (Recursive Least Square). For this embodiment, a case of using an LMS algorithm is described and moreover, a case of using a RLS algorithm will be described later.

First, the general expression of LMS is described below.

The update expression of LMS is generally shown by the following expression 5.

[Numerical Formula 5]

$$h(t+1)=h(t)+u*e(t)*u(t) \quad \text{(Expression 5)}$$

In the above expression, h(t) denotes a filter tap coefficient at the time t, $\mu$ denotes a step size parameter which is a coefficient about the time or accuracy of convergence, e(t) denotes an error signal at the time t, and u(t) denotes an input signal series at the time t.

Moreover, the above error signal e(t) is generally shown by the following expression (6).

[Numerical Formula 6]

$$e(t)=d(t)-u(t)*h(t) \quad \text{(Expression 6)}$$

In this case, d(t) is generally referred to as a unique word or training signal, which uses an already-known signal predetermined at the transmission and reception sides. The operation algorithms used for the expressions (5) and (6) make it possible to converge the error signal e(t) to 0 by updating filter-tap-coefficient series one after another.

Then, a case is described below in which the above LSM algorithm is applied to this embodiment.

When applying the above expression (5) to this embodiment, h(t) serves as a filter-tape-coefficient series output from the filter-tap-coefficient-operation control section 64 to the adaptive filter 62 and u(t) serves as a signal series (shown in the above expression 1) to be output from the delay element 61 to the filter-tap-coefficient-operation control section 64.

Moreover, this embodiment uses a signal (shown in the above expression 4) output from the subtracter 63 as the above error signal e(t) and this is a feature of the interference removing circuit of this embodiment and the processing different from the normal LMS algorithm is performed.

First, if the delay element 61 is not used, the signal e(t) output from the subtracter 63 converges to 0 because the above operation algorithm makes the error signal e(t) approach to 0 and the filter-tap-coefficient series h(t) is generated which removes not only an interference signal but also a diffusion signal according to the CDMA mode from a reception signal.

Moreover, because this embodiment is provided with the above delay element 61, a time difference equal to a delay time τ is present between a signal r(t–τ) input from the delay element 61 to the filter-tap-coefficient-operation control section 64 and the signal e(t) input to the filter-tap-coefficient-operation control section 64 through the subtracter 63.

In this case, the diffusion signal r(t) according to the CDMA mode is not correlated with the diffusion signal r(t–τ) delayed by one-chip time or more from the signal r(t). Therefore, when the operation algorithm converges the error signal e(t) to 0, the diffusion signal component of u(t) is not correlated with r(t) and thereby, the component is left as the error e(t). That is, because the influence of the diffusion signal component theoretically becomes 0 by continuously adding the input signal series u(t) in the above expression (4), the diffusion signal component is not removed but it is left as the error e(t). However, because the interference signal component which temporally slowly fluctuates compared with chip data has a correlation even if there is a delay of several chip times, the filter-tap-coefficient series h(t) capable of removing only the interference signal component from a reception signal is generated.

That is, the above operation algorithm applied to this embodiment leaves a component (that is, interference signal component in which u(t) correlates with e(t) in a signal output from the adaptive filter 62 while the algorithm can generate the filter-tap-coefficient series h(t) which does not leave a component having no correlation (that is, diffusion signal component) in a signal output from the adaptive filter 62.

According to the above operation algorithm, the adaptive filter 62 of this embodiment can extract only the interference component from a reception signal and output the component to the subtracter 63. The subtracter 63 can output a signal obtained by removing only an interference signal component from a reception signal (that is, diffusion signal according to the CDMA mode).

As described above, the interference-signal removing apparatus shown in FIG. 11 makes it possible to adaptively remove narrow-band interference signals from reception signals including wide-band diffusion signals diffused and modulated in accordance with the CDMA mode and the narrow-band interference signals by using the characteristic of the diffusion signal, prevent reception quality from deteriorating, and improve the reception quality.

Though FIG. 11 shows a configuration for preventing a signal output from the subtracter 63 from being delayed, it is also possible to obtain the same advantage as the above mentioned by a configuration for delaying a reception signal input to the subtracter 73 by the delay element 71 while preventing a reception signal input to the adaptive filter 72 or filter-tap-coefficient-operation control section 74 from being delayed as shown in FIG. 13. The configuration shown in FIG. 13 is almost the same as the configuration shown in FIG. 11 except that the delay element 71 is set to the subtracter 73.

Moreover, it is possible to obtain the interference removal effect same as the above mentioned by using an algorithm other than the above LMS algorithm. For example, a specific update expression when using the RLS algorithm in the configuration shown in FIG. 11 is described below. In the description below, objects corresponding to the above u(t), h(t), e(t), d(t) and r(t) are shown by the same symbols for convenience' sake of description.

For example, an n-row one-column vector constituted of the same component as u(t) shown by the above expression 1 is assumed as an input series u(t) and an n-row one-column vector constituted of n filter tap coefficients similarly to h(t) shown in the above expression 2 is assumed as a filter-tap series h(t).

Moreover, the error signal e(t) in RLS is shown by the following expression 7 as a signal corresponding to the error signal e(t) shown by the above expression 6. Moreover, $u^T(t)$ shows transposed u(t).

[Numerical Formula 7]

$$e(t)=d(t)-u^T(t)*h(t) \quad \text{(Expression 7)}$$

In the case of this embodiment, the reception signal r(t) input to the subtracter 63 is used as d(t) and $u^T(t)*h(t)$ in the above expression 7 corresponds to an interference extraction signal output from the adaptive filter 62. That is, similarly to the case of using the above LMS algorithm, the error signal e(t) shown by the above expression 7 uses a signal output from the subtracter 63 and this is a feature of this embodiment.

When the delay element 61 is not used similarly to the case of using the above LMS algorithm, the error signal e(t) converges to 0.

Moreover, by using a coefficient-error correlation matrix P(t) that is an n-row n-column matrix and a gain vector k(t)

that is an n-row one-column vector, the update expression of RLS is shown by the following expressions 8 to 10.

[Numerical Formula 8]

$$h(t)=h(t-1)+k(t)*e(t) \quad \text{(Expression 8)}$$

[Numerical Formula 9]

$$k(t)=\{P(t-1)*u(t)\}/\{1+u^T(t)*P(t-1)*u(t)\} \quad \text{(Expression 9)}$$

[Numerical Formula 10]

$$P(t)=P(t-1)-k(t)*u^T(t)*P(t-1) \quad \text{(Expression 10)}$$

Moreover, the initial value h(0) of the above filter-tap-coefficient series h(t) uses a zero vector as shown by the expression 11 and the initial value P(0) of the above coefficient-error correlation matrix P(t) uses a matrix in which every diagonal element in which the number of rows coincides with the number of columns is a positive real number c and elements other than the diagonal element are 0 as shown by the expression 12. Symbol $h^T(\mathbf{0})$ denotes transposed h(0). Moreover, I in the expression 12 denotes an n-row n-column matrix in which every diagonal element in which the number of rows coincides with the number of columns is 1 and elements other than the diagonal element are 0.

[Numerical Formula 11]

$$h^T(\mathbf{0})=\{0, 0, 0, \ldots, 0\} \quad \text{(Expression 11)}$$

[Numerical Formula 12]

$$P(0) = c*I = \begin{pmatrix} c0 & \cdots & 0 \\ 0 & \cdots & \cdots \\ \cdots & c & \cdots \\ \cdots & \cdots & 0 \\ 0 & \cdots & 0c \end{pmatrix} \quad \text{(Expression 12)}$$

A filter-tap-coefficient-operation control section 24 updates filter-tap-coefficient series h(t) one by one in accordance with the above update expression of RLS and thereby, it is possible to make a signal output from the adaptive filter 62 slowly approach to an actual interference signal component similarly to the case of using the above LMS algorithm. Thus, it is possible to remove narrow-band interference signals from reception signals including wide-band diffusion signals diffused and modulated in accordance with the CDMA mode and the narrow-band interference signals.

FIG. 14 shows an interference-signal removing apparatus for inputting I and Q components of reception signals including a CDMA signal (desired signal) and an FM signal (interference signal) and removing the FM signal from the I component rI(t) and the Q component rQ(t). In the case of the interference-signal removing apparatus, when removing the interference signals from the I and Q components of the reception signals including the diffusion signals diffused and modulated in accordance with the CDMA mode and the interference signals, time-difference means 81a and 81b provides a time difference for one chip of the diffusion signal between two signals obtained by dividing I component and between two signals obtained by dividing Q component, extraction means 82a, 82b, 83a, and 83b extract I and Q components from an interference signal component by using a signal component correlated between one reception signal constituted of I and Q components provided with the time difference and the other reception signal constituted of I and Q components as the interference signal component, and removal means 84a, 84b, 85a, and 85b remove I component of the extracted interference signal component from I component of the reception signal and Q component of the extracted interference signal component from Q component of the reception signal.

Specifically, the interference-signal removing apparatus shown in FIG. 14 is provided with a delay element 81a for delaying an I-phase signal (I component) orthogonally-detected from a reception signal, a delay element 81b for delaying a Q-phase signal (Q component) orthogonally-detected from the reception signal, four adaptive filters 82a, 82b, 83a, and 83b for extracting an interference signal component from I or Q component delayed in accordance with a tap-coefficient control signal output from a filter-tap-coefficient-operation control section 86 to be described later, an adder 84a for adding I component of the interference signal component, an adder 84b for adding Q component of the interference signal component, a subtracter 85a for removing I component of the interference signal component from I component of the reception signal, a subtracter 85b for removing Q component of the interference signal component from Q component of the reception signal, and a filter-tap-coefficient-operation control section 86 for outputting a tap-coefficient control signal according to signals output from the subtracters 85a and 85b and I and Q components of a delayed reception signal to the adaptive filters 82a, 82b, 83a, and 83b.

A configuration and operations of the circuit shown in FIG. 14 are described below.

I component rI(t) and Q component rQ(t) orthogonally detected from a reception signal by a receiver are input to the circuit and the input signals rI(t) and rQ(t) include a wideband diffusion signal diffused and modulated in accordance with the CDMA mode and an interference signal (e.g. FM signal) according to a communication mode using a narrow band. In this case, similarly to the case of performing description by referring to FIG. 11, t denotes time, which is assumed as an integral discrete value using one-sample time as the minimum unit in the case of this embodiment.

The above I component rI(t) is first divided into two signals in which one signal is input to the delay element 81a while the other signal is input to the subtracter 85a. Moreover, the above Q component rQ(t) is first divided into two signals in which one signal is input to the delay element 81b while the other signal is input to the subtracter 85b.

Each of the delay elements 81a and 81b has a function for delaying an input signal by the time width for one chip of a diffusion signal or more and outputting the signal, for example, similarly to the delay element 61 as that shown in FIG. 11. These two delay elements 81a and 81b provide the same delay time. Moreover, similarly to the case of performing description by referring to FIG. 11, specifically, the signal of I component output from the delay element 81a is shown as rI(t−τ) and the signal of Q component output from the delay element 81b is shown as rQ(t−τ). In this case, T denotes a delay time provided from the delay elements 81a and 81b.

The signal rI(t−τ) output from the delay element 81a is input to two adaptive filters 82a and 83b and the filter-tap-coefficient-operation control section 86 while the signal rQ(t−τ) output from the delay element 81b is input to two adaptive filters 82b and 83b and the filter-tap-coefficient-operation control section 86.

The configuration of each of the adaptive filters 82a, 82b, 83a, and 83b is the same as that shown in FIG. 12. In this case, this embodiment is provided with four adaptive filters 82a, 82b, 83a, and 83b in order to perform the complex operation of I and Q phases. Specifically, this is because I and Q components of an interference signal component are included in I and Q components of a reception signal. Moreover, this embodiment uses two filter-tap-coefficient series hI(t) and hQ(t) of I and Q phases. In this case, hI(t) and hQ(t) are vectors.

Specifically, in the case of this embodiment, filter-tap-coefficient series hI(t) and hQ(t) for making it possible that the adaptive filter 82a can extract I component of an interference signal component from I component rI(t−τ) of an input reception signal, the adaptive filter 83a can extract Q component of the interference signal component from I component rI(t−τ) of the input reception signal, the adaptive filter 82b can extract Q component of the interference signal component from Q component rQ(t−τ) of the input reception signal, and the adaptive filter 83b can extract I component of the interference signal component from Q component rQ(t−τ) of the input reception signal are generated by the filter-tap-coefficient-operation control section 86 to be described later.

The adder 84a has a function for adding signals output from the adaptive filters 82a and 83b and outputting the addition result to the subtracter 85a. The addition result output to the subtracter 85a becomes the interference signal component in I component of a reception signal (that is, I component of the interference signal component) FMI(t). In the case of this embodiment, the adder 84a inverts positive and negative of a signal output from the adaptive filter 83b and performs the above addition. However, when inversion of positive and negative is performed by the above adaptive filter 83b or the filter-tap-coefficient-operation control section 86 to be described later, the adder 84a does not have to perform the above inversion of positive and negative.

The adder 84b has a function for adding signals output from the adaptive filters 82b and 83b and outputting the addition result to the subtracter 85b. The addition result output to the subtracter 85b becomes an interference signal component in Q component of a reception signal (that is, Q component of interference signal component) FMQ(t).

In this case, I component FMI(t) of the interference signal component output from the above adder 84a is shown by the following expression 13 and Q component FMQ(t) of the interference signal component output from the above adder 84b is shown by the following expression 14. In the expressions 13 and 14, uI(t) and uQ(t) are vectors and correspond to I and Q components of u(t) shown by the expression 1 in the description using FIG. 11.

[Numerical Formula 13]

$$FFMI(t)=\{hI(t)*uI(t)\}+\{-hQ(t)*uQ(t)\} \qquad ((\text{Expression 13})$$

[Numerical Formula 14]

$$FFQ(t)=\{hI(t)*uQ(t)\}+\{hQ(t)*uI(t)\} \qquad (\text{Expression 14})$$

The subtracter 85a has a function for inputting the input signal rI(t) of not-delayed I component and the signal FMI(t) output from the adder 85a, subtracting the output signal FMI(t) from the input signal rI(t), and outputting the subtraction result eQ(t).

Similarly, the subtracter 85b has a function for inputting the input signal rQ(t) of not-delayed Q component and the signal FMQ(t) output from the adder 84b, subtracting the output signal FMQ(t) from the input signal rQ(t), and outputting the subtraction result eQ(t).

In this case, the above subtraction results eI(t) and eQ(t) are signals output from the interference-signal removing apparatus of this embodiment.

In the case of this embodiment, tap-coefficient control signals output from the filter-tap-coefficient-operation control section 86 to be described later are updated one by one and thereby, interference-wave extraction signals FMI(t) and FMQ(t) of the above I and Q components become the same signals as interference signals in I and Q components of a reception signal. Therefore, the above subtraction results eI(t) and eQ(t) become signals obtained by removing the interference signals from I and Q components of the reception signal, that is, diffusion signals according to the CDMA mode (ideally, only the diffusion signals).

The filter-tap-coefficient-operation control section 86 receives the signals rI(t−τ) and rQ(t−τ) from the delay elements 81a and 81b and the signals eI(t) and eQ(t) from the subtracters 85a and 85b. The filter-tap-coefficient-operation control section 86 has a function for computing tap-coefficient control signals for changing signals output from the adaptive filters 82a, 82b, 83a, and 83b to the above interference signal components, and outputting them to the adaptive filters 82a, 82b, 83a, and 83b. This embodiment is set so that the same tap-coefficient control signals are output to the adaptive filters 82a and 82b while the same tap-coefficient control signals are output to the remaining adaptive filters 83a and 83b and thereby, the interference signal components FMI(t) and FMQ(t) shown by the above expressions 13 and 14 are generated.

The filter-tap-coefficient-operation control section 86 of this embodiment computes a tap-coefficient control signal by using the algorithm for complex operation of LMS shown in the description using FIG. 11. The update expressions of LMS in this algorithm are shown by the following expressions 15 and 16.

[Numerical Formula 15]

$$hI(t+1)=hI(t)+u*(eI(t)*uI(t)+eQ(t)*uQ(t)) \qquad (\text{Expression 15})$$

[Numerical Formula 16]

$$hQ(t+1)=hQ(t)+u*(eQ(t)*uI(t)-eI(t)*uQ(t)) \qquad (\text{Expression 16})$$

In the above expressions, hI(t) and hQ(t) denote filter-tap-coefficient series at the time t, μ denotes a step size parameter serving as a coefficient relating to convergence time and accuracy, and uI(t) and uQ(t) denote input signal series in shift registers of the adaptive filters 82a, 83a and shift registers in the adaptive filters 82b and 83b. Moreover, similarly to the case of performing description by referring to FIG. 11, eI(t) and eQ(t) use signals output from the subtracters 85a and 85b. uI(t) and uQ(t) denote vectors as described above.

Similarly to the case of performing description by referring to FIG. 11, by updating the filter-tap series hI(t) and hQ(t) by the operation algorithm sequentially this embodiment makes it possible to generate the filter-tap series hI(t) and hQ(t) capable of removing interference signal components having a comparatively high correlation each other without removing diffusion signal components because they are not correlated with each other.

Moreover, because this embodiment considers I and Q components when computing the filter-tap-coefficient series hI(t) and hQ(t), it is possible to further improve the accuracy of interference removal.

As described above, the interference-signal removing apparatus shown in FIG. 9 can remove interference signals from I and Q components of reception signals including diffusion signals diffused and modulated in accordance with the CDMA mode and the interference signals by using the characteristic of the diffusion signal and thereby, it is possible to prevent reception quality from deteriorating and improve the reception quality.

Similarly to the case of performing description by referring to FIG. 11, FIG. 14 shows a configuration for preventing signals output from the subtracters 85a and 85b from delaying. However, as shown in FIG. 15 it is possible to obtain the same advantage as the above by a configuration for delaying reception signals input to subtracters 95a and 95b by delay elements 91a and 91b while preventing reception signals input to adaptive filters 92a, 92b, 93a, and 93b and a filter-tap-coefficient-operation control section 96 from delaying. In this case, the configuration shown in FIG. 15 is the same as the configuration shown in FIG. 14 except that the delay elements 91a and 91b are provided for the subtracters 95a and 95b and adders 94a and 94b are also provided together with the above components.

Moreover, similarly to the case of performing description by referring to FIG. 11, it is possible to obtain the interference removal effect same as the above described by using an algorithm other than the above-described LMS algorithm for complex operation. As an example, the case of using the RLS algorithm for complex operation for the configuration shown in FIG. 9 is described below. For convenience' sake of description, objects corresponding to the above uI(t), uQ(t), hI(t), and hQ(t), eI(t), eQ(t), rI(t), and rQ(t) are provided with same symbols.

In the case of the RLS algorithm for complex operation, all parameters of u(t), h(t), e(t), k(t), and P(t) shown by the above expressions 7 to 10 are constituted of complex-number elements. In this case, when assuming γ and ω as real numbers and using j as a symbol for showing an imaginary-number part, an optional complex-number element is shown as (γ+jω).

Moreover, in the case of the RLS algorithm for complex operation, the sequential updating described by referring to FIG. 11 is realized in complex operation by separating the real-number part from the imaginary-number part of each of the above parameters and using the real-number part as an I-component parameter and the imaginary-number part as a Q-component parameter.

Specifically, in the case of this embodiment, the processing for removing interference signal components from the I component rI(t) and Q component rQ(t) of a reception signal is performed by assuming the real-number part of u(t) as uI(t) and the imaginary-number part of u(t) as uQ(t), the real-number part of h(t) as hI)(t) and the imaginary-number part of h(t) as hQ(t), and the real-number part of e(t) as eI(t) and the imaginary-number part of e(t) as eQ(t).

As described above, also when using the RLS algorithm for complex operation, it is possible to remove interference signals from I and Q components of reception signals including diffusion signals diffused and modulated in accordance with the CDMA mode and the interference signals similarly to the case of using the above LMS algorithm for complex operation.

SUMMARY OF THE INVENTION

The state in which interference is removed by the above conventional interference-signal removing apparatus is specifically described below.

FIG. 16 shows a spectrum of a reception signal before an interference signal is removed. As the reception signal, a signal is shown in which two waves of FM signals interfere with a CDMA signal. Abscissas of the graphs in FIG. 16 and FIGS. 17 and 18 to be described later respectively indicate frequency (MHz) and ordinates of them respectively indicate spectrum intensity of signal.

Moreover, FIG. 17 shows a spectrum of an output signal (from the interference-signal removing apparatus) immediately after inputting the reception signal shown in FIG. 16 to the interference-signal removing apparatus shown in FIG. 11 and removing interference signals (in this case, two waves of FM signals) included in the reception signal (immediately after starting interference-signal removal). From FIG. 17, it is found that the frequency component of a CDMA signal located nearby the frequency of an interference signal is simultaneously removed from a signal output from the interference-signal removing apparatus immediately after starting the interference signal removal. In this case, the above trouble occurs because an adaptive filter extracts an interference signal from a reception signal and simultaneously extracts a CDMA signal and removes not only the interference signal but also a CDMA signal component. This is a phenomenon always occurs independently of the magnitude of interference-signal power in the adaptive filter mode for extracting and removing an interference signal component from a reception signal. As a result, a problem occurs that a bit error ratio of the reception signal is deteriorated after removing interference.

Moreover, the above conventional interference-signal removing apparatus has a problem that when starting interference signal removal and then still continuing the removal, the CDMA component in a reception signal is also attenuated and the attenuation progresses in accordance with the elapse of time.

Specifically, FIG. 18 shows a spectrum of an output signal (from an interference-signal removing apparatus) when interference signal removal is continued for a while after the state shown in FIG. 17. As shown in FIG. 18, when some time passes after the interference signal removal is started, the CDMA signal component to be left in the output signal is greatly attenuated, the spectrum is disarranged, and the band is spread.

Therefore, though the conventional interference-signal removing apparatus has a capacity for adaptively removing a narrow-band interference signal, it has a problem of gradually removing a CDMA signal which is a desired wave in accordance with the elapse of time.

In this case, it is considered that a CDMA signal is extracted simultaneously when estimating an interference signal as a reason of the above trouble. That is, this is because a CDMA signal component which does not originally have any correlation and must not be estimated by providing a time difference for one chip or more locally has a correlation due to a factor such as inter-code interference because of the influence of a ban-restriction filter and is estimated as an interference signal. Therefore, the spectrum is disarranged and the band is spread. Thus, as a result, a problem occurs that the bit error ratio of a reception signal free from interference is deteriorated. This phenomenon always occurs independently of presence or absence of an interference signal by operating an interference-signal removing apparatus for a long time and has a feature that the phenomenon more easily occurs as the power of a CDMA signal component increases. Therefore, the phenomenon remarkably occurs because the CDMA power is remarkably increased by AGC control under an environment in which no interference signal is present.

FIG. 19 shows interference-signal-removal characteristics when interference is removed by using the above conventional interference-signal removing apparatus. FIG. 19 shows a state in which bit error ratios of a reception signal are changed as interference signal removal characteristics, in which a characteristic when interference is not removed by the interference-signal removing apparatus (when there is no cancel) is shown by (a) and a characteristic in which interference is removed by the apparatus (when there is a cancel) is shown by (b).

Moreover, FIG. 19 shows a case in which a CDMA signal is used as a wide-band desired signal, an FSK (Frequency Shift Keying) signal is used as a narrow-band interference signal, and an interference signal has one wave. Furthermore, the abscissa of the graph in FIG. 19 indicates D/U {(power of desired input signal)/(power of narrow-band interference signal)} per interference signal [dB] and the ordinate of it indicates bit error ratio in a receiver.

As shown in FIG. 19, when D/U is relatively small (that is, when the power of a narrow-band interference signal is large enough compared to the power of a wide-band desired signal), it is possible to improve the characteristic of a bit error ratio by removing interference by an interference-signal removing apparatus. However, when D/U is relatively large (that is, when the power of a narrow-band interference signal is almost equal to or smaller than the power of a wide-band desired signal), the characteristic of the bit error ratio may be deteriorated by removing interference by the interference-signal removing apparatus.

In this case, a reason same as the above is considered as a reason of the above deterioration. That is, it is considered that in the processing for extracting the frequency component of a narrow-band interference signal from a reception signal and removing the extraction result from the reception signal, the interference-signal removing apparatus extracts not on the interference signal but also the frequency component of a wide-band desired signal.

FIGS. 20A and 20B show states in which narrow-band interference signals are removed from reception signals including wide-band signals and the narrow-band interference signals by the above conventional interference-signal removing apparatus.

Specifically, FIG. 20A shows a state in which the power of a narrow-band interference signal (interference signal of ① or ② in FIG. 20A) is large enough compared to the power of the wide-band signal. In this case, it is possible to improve reception quality by removing interference as described above.

FIG. 20A shows three signals ①, ②, and ③ interfering with the wide-band signal, in which states of reception signals before interference is removed are shown in the left graph and states of reception signals after interference is removed are shown in the right graph. Moreover, abscissas of these graphs respectively indicate frequency and ordinates of them respectively indicate spectrum intensity.

FIG. 20B shows a state in which the power of the wide-band signal is (almost) equal to (or smaller than) the power of each narrow-band interference signal. In this case, the frequency component of the wide-band signal is extracted together with a narrow-band interference signal as described above. Therefore, when a signal output from the interference-signal removing apparatus is demodulated by a circuit at the rear stage of (the interference-signal removing apparatus), deterioration of reception quality is increased up to a value that cannot be neglected.

Therefore, in the case shown in FIG. 20B, it can be said that the reception quality is rather improved in accordance with the suppression effect of an interference signal which is also the characteristic of a CDMA signal compared to the case of removing interference by the interference-signal removing apparatus.

FIG. 20B shows three signals ④, ⑤, and ⑥ interfering with the wide-band signal, in which states of reception signals before interference is removed are shown in the left graph and states of reception signals after interference is removed are shown in the right graph. Furthermore, abscissas of these graphs respectively indicate frequency and ordinates of them respectively indicate spectrum intensity.

Furthermore, because the interference-signal removing apparatus shown in FIG. 11 updates the filter-tap-coefficient series h(t) by using the adaptive algorithm shown by the above expression 5, operation results {h(t)} up to the last time are always accumulated every operation of the next-time filter-tap-coefficient series h(t+1) shown by the above expression 5. Therefore, in the case of the interference-signal removing apparatus, up to the signal component of the wide-band signal is extracted and a part of the wide-band signal is removed due to the influence of inter-code interference by a band-restriction filter. Also in this case, deterioration of reception quality is increased up to a value which cannot be neglected in demodulation by a receiver similarly to the case of the above described.

As described above, the above conventional interference-signal removing apparatus has a problem that the above interference-signal characteristics shown in FIG. 19 are shown, that is, the reception-quality characteristic may be deteriorated when the power of a narrow-band signal becomes smaller than the power of the wide-band signal compared to the case of not removing interference.

Specifically, in the case of the currently-considered communication mode, when using the CDMA mode and TDMA mode together or CDMA mode and FDMA mode together and using a receiver having the above conventional interference-signal removing apparatus, a problem may occur that reception quality is rather deteriorated if no interference signal is present in a reception signal. Moreover, problems may occur that the number of mobile-station systems (number of users) which can be housed depending on a base-station system is decreased and a talking area is contracted compared to the case of removing no interference signal.

The present invention is made to solve the above conventional problems and its object is to provide an interference-signal removing apparatus improved to suppress that even a desired signal is removed when removing narrow-band interference signals from input signals including wide-band desired signals and the narrow-band interference signals.

First, the technical idea common to the whole of the present invention is described below.

That is, to remove narrow-band interference signals from input signals including wide-band desired signals and the narrow-band interference signals, an interference-signal removing apparatus of the present invention suppresses the interference signal amount to be extracted (that is, decreases the interference signal amount to be extracted compared to the case of the conventional apparatus) included in the input signals in accordance with the input signals and extracts them.

Therefore, because the interference signal amount to be extracted from input signals is suppressed in accordance with the input signals, it is possible to suppress that even desired signals (for example, desired-signal components included in frequency bands of interference signals and desired-signal components adjacent to frequency band of interference signals) are removed from input signals including wide-band desired signals and narrow-band interference signals.

For example, when a CDMA signal is used as a wide-band desired signal, it is possible to suppress that even a CDMA-signal component is removed by controlling the interference removing capacity in order to remove interference signals from signals (signals including CDMA signals and narrow-band interference signals) received by a receiver. Thereby, it is possible to improve the bit-error-ratio characteristic of a reception signal after interference is removed compared to a conventional case.

That is, because a signal (diffused signal) according to the spectrum diffusion mode such as the CDMA mode originally has a high interference-resistance capacity by a diffusion gain, it is permitted to attenuate the power of a narrow-band interference signal up to a level almost equal to the power of a diffused desired wave (such as a CDMA signal) without excessively removing narrow-band interference signals. Therefore, by suppressing the interference removing capacity up to a degree at which the component of a CDMA signal or the like is not removed, it is generally possible to improve the bit error ratio after interference is removed because removal of the component of a CDMA signal or the like is suppressed even if some interference signal components remain in reception signals.

When a plurality of narrow-band interference signals are superimposed on wide-band desired signals in a reception-system transmission line and received by a receiver, it is possible to realize interference removal corresponding to each interference signal by dividing a reception signal into a plurality of bands so that each band includes one or more interference signals, and performing interference removal suitable for interference signals included in each band.

In this case, it is permitted to use various signals as wide-band desired signals. For example, it is possible to use a signal diffused in accordance with the CDMA mode.

Moreover, it is permitted to use various signals as narrow-band signals. For example, it is possible to use an FM signal and an FSK signal.

Furthermore, it is permitted to use various methods as methods for suppressing the interference signal amount to be extracted in accordance with input signals. For example, it is preferable to control whether to control the interference signal amount to be extracted or not in accordance with the state of a desired signal or interference signal included in input signals, and it is preferable to control the degree of suppression when controlling the interference signal amount to be extracted in accordance with the state of a desired signal or interference signal included in input signals.

Furthermore, an interference-signal removing apparatus of the present invention removes narrow-band interference signals from input signals including wide-band desired signals and the narrow-band interference signals in accordance with the following configuration as an embodiment.

That is, extraction means extracts interference signals from input signals, removal means removes extracted interference signals from the input signals, extraction control means controls extraction of interference signals by the extraction means in accordance with removal results of the removal means, and extraction-amount suppression means suppresses the interference signal amount to be extracted by the extraction means in accordance with input signals.

In this case, to control extraction of interference signals by the extraction means in accordance with removal results of the removal means, a method is used which performs control so that components of interference signals included in input signals after interference is removed by the removal means are minimized (ideally, zero). Moreover, in the case of the present invention, the extraction-amount suppression means suppresses the interference signal amount to be extracted for the above control method.

For example, in the case of the interference-signal removing apparatus shown in FIG. 11, the extraction means of the present invention is constituted of adaptive filters, the removal means of the present invention is constituted of subtracters, and the extraction control means of the present invention is constituted of a filter-tap-coefficient-operation control section. Moreover, the present invention is further provided with extraction-amount suppression means for suppressing the interference signal amount to be extracted.

Then, an interference-signal removing apparatus of the present invention is described below in detail. The present invention provide a preferable configuration for realizing the above suppression of the interference signal amount to be extracted by using a configuration for extracting the inner product between an input vector to be mentioned later and a control vector to be mentioned layer as an interference signal.

To achieve the above object, an interference-signal removing apparatus of the resent invention suppresses the interference signal amount to be extracted in order to remove the interference signals from input signals as described below as one mode.

That is, extraction control means computes a control vector constituted of a plurality of digital control values for controlling extraction of interference signals and outputs the vector to extraction means, the extraction means extracts the inner product of an input vector constituted of a plurality of input signal values (values of input signals) and a control vector output from extraction control means, and extraction-amount suppression means restricts effective word lengths of digital control values constituting the control vector output from the extraction control means and suppresses the interference signal amount to be extracted by the extraction means.

Therefore, by restricting effective word lengths of the digital control values constituting the control vector for generating interference signals to be extracted, it is possible to reduce the interference signal amount to be extracted and thereby, suppress the interference signal amount to be extracted by the extraction means.

In this case, the number of (digital) control values constituting the control vector is optional.

Moreover, the number of input signal values constituting the input vector is set to a value equal to the number of control values constituting the control vector.

Furthermore, restricting the effective word lengths of digital control values corresponds to reducing the digital control values in accordance with the degree of the restriction.

Furthermore, to restrict the effective word length of a control vector output from the extraction control means, it is permitted to use a method of restricting an effective word length before or after the control vector is output.

When the interference-signal removing apparatus shown in FIG. 11 is used, the (reception) input signal value r(t) corresponds to an input signal value of the present invention, the input signal series u(t) corresponds to an input vector of the present invention, the filter-tap-coefficient control signal hi corresponds to a (digital) control value of the present invention, and the filter-tap-coefficient series h(t) corresponds to a control vector of the present invention.

Moreover, an interference-signal removing apparatus of the present invention suppresses the interference signal amount to be extracted in order to extract interference signals from input signals and remove the interference signals as described below as one mode.

That is, extraction control means computes a control vector constituted of a plurality of control values for controlling extraction of interference signals in accordance with a digital operator and outputs the control vector to extraction means, the extraction means extracts the inner product of an input vector constituted of a plurality of input signal values and the control vector output from the extraction control means, and extraction-amount suppression means restricts the effective word length of the digital operator used by the extraction control means and suppresses the interference signal amount to be extracted by the extraction means.

Therefore, by restricting the effective word length of the digital operator for computing the control vector, it is possible to make the control vector which is the operation result small and decrease the extracted amount of interference signal. Thereby, it is possible to suppress the interference signal amount to be extracted by the extraction means.

In this case, restricting the effective word length of the digital operator corresponds to reducing the value of the digital operator in accordance with the degree of the restriction.

Moreover, an interference-signal removing apparatus of the present invention suppresses the interference signal amount to be extracted in order to remove the interference signals from input signals as described below as one mode.

That is, extraction control means computes a control vector constituted of a plurality of control values for controlling extraction of interference signals and outputs the control vector to extraction means, the extraction means extracts the inner product of an input vector constituted of a plurality of input signal values and the control vector output from the extraction control means as an interference signal, and extraction-amount suppression means multiplies the control vector output from the extraction control means by a control coefficient of less than 1 and controls the interference signal amount to be extracted by the extraction means.

Therefore, by multiplying the control vector output from the extraction control means by a control coefficient of less than 1, it is possible to make the control vector small and reduce the amount of interference signal to be extracted and thereby, suppress the interference signal amount to be extracted by the extraction means.

In this case, it is permitted to use an optional value as the value of a control coefficient of less than 1. For example, the value of the control coefficient is decided in accordance with the power level of a desired signal or an interference signal included in input signals.

Moreover, to multiply the control vector output from the extraction control means by a control coefficient of less than 1, it is permitted to use a method of performing the above multiplication before or after the control vector is output.

Furthermore, an interference-signal removing apparatus of the present invention suppresses the interference signal amount to be extracted in order to extract the interference signals from input signals and remove the interference signals as described below as one mode.

That is, extraction control means updates a control vector constituted of a plurality of control values for controlling extraction of interference signals by using the last-time control vector and outputs the update result to extraction means, the extraction means extracts the inner product of an input vector constituted of a plurality of input signal values and the control vector output from the extraction control means as an interference signal, and extraction-amount suppression means multiplies the last-time control vector used for update of the control vector by the extraction control means by a control coefficient of less than 1 and suppresses the interference signal amount to be extracted.

Therefore, by multiplying the last-time control vector used for update of the control vector by a control coefficient of less than 1, it is possible to make the control vector after update small and reduce the amount of interference signal to be extracted. Thereby, it is possible to suppress the interference signal amount to be extracted by the extraction means.

In this case, it is permitted to use an optional value as a control coefficient of less than 1. For example, the control coefficient is decided in accordance with the power level of a desired signal or interference signal included in input signals.

When the interference-signal removing apparatus shown in FIG. 11 is used, the last-time filter-tap-coefficient series h(t) used to compute the updated filter-tap-coefficient series h(t+1) corresponds to the last-time control vector of the present invention.

Moreover, in the case of an interference-signal removing apparatus of the present invention using the above control coefficient, extraction-amount suppression means controls the value of the control coefficient in accordance with an input signal (for example, changes values of the control coefficient) and suppresses the interference signal amount to be extracted by performing the multiplication between a control vector (control vector output from the extraction control or last-time control vector used for update of a control vector by the extraction control means) and a control coefficient at a predetermined time interval as one mode.

In this case, it is permitted to use an optional time interval as the predetermined time interval. For example, it is preferable to set a time interval in which the interference signal amount to be extracted by the extraction means is actually effectively suppressed. By setting the above time interval, it is possible to decrease the number of multiplications between control vectors and control coefficients and thereby, reduce the operational throughput.

Moreover, in the case of an interference-signal removing apparatus of the present invention using the above control coefficient, extraction-amount suppression means performs the multiplication between a control vector (control vector output from extraction control means or last-time control vector used for update of control vector output from extraction control means) and a control coefficient at a predetermined cycle to suppress the interference signal amount to be extracted by the extraction means while keeping the control coefficient constant as one mode.

It is permitted to use an optional value as the above constant value (value of control coefficient).

Moreover, it is permitted to use an optional cycle as above the predetermined cycle. For example, it is preferable to set a cycle at which the interference signal amount by the extraction means to be extracted is actually and effectively suppressed. By setting the above cycle, it is possible to reduce the number of multiplications between control vectors and control coefficients and thereby, reduce the operational throughput.

Furthermore, in the case of an interference-signal removing apparatus of the present invention, extraction control means computes or update control vectors at a predetermined time interval when the temporal change of interference signals included in input signals are comparatively gentle.

In this case, it is permitted to use an optional time interval as the above predetermined time interval. For example, it is preferable to set a time interval capable of following the temporal change of interference signals. By setting the above time interval, it is possible to reduce the number of operations or updates of control vectors and thereby, reduce the operational throughput.

Moreover, in the case of an interference-signal removing apparatus of the present invention, extraction-amount suppression means suppresses the interference signal amount to be extracted by extraction means in a mode previously set in accordance with an input signal as one mode.

Specifically, when a necessary signal (for example, multimedia signal such as video signal) is included in input signals in addition to desired signals and interference signals, by previously performing setting so that the necessary signal is not removed, it is possible to prevent the necessary signal from being removed.

Moreover, in the case of an interference-signal removing apparatus of the present invention, extraction-amount suppression means suppresses the interference signal amount to be extracted by extraction means in accordance with the power difference between a desired signal and an interference signal included in input signals as a preferable mode. That is, to receive input signals including a CDMA signal and a narrow-band interference signal, the interference signal amount to be extracted is suppressed correspondingly to the difference between the reception power of the CDMA signal and that of the narrow-band interference signal.

It is possible to detect the power level of a desired signal and that of an interference signal included in input signals by analyzing spectrums of the input signals.

The following Items (1) to (4) show specific methods for suppressing the interference signal amount to be extracted in accordance with the power difference between a wide-band signal (desired signal) and a narrow-band interference signal.

(1) When the power of a wide-band signal is larger than the power of a narrow-band interference signal 5 dB or more, the interference signal amount to be extracted is suppressed (to zero) so that interference is not removed.

(2) When the difference between the power of a wide-band signal and that of a narrow-band interference signal is kept within ±5 dB, the interference signal amount to be extracted is suppressed comparatively large so that interference is slightly removed in order to realize that wide-band signals in the band of interference signals are not greatly removed.

(3) When the power of a narrow-band interference signal is larger than that of a wide-band signal 5 to 35 dB, the interference removal capacity is increased compared to the case in the above Item (2) to suppress the interference signal amount to be extracted in accordance with the power of these signals.

(4) When the power of a narrow-band interference signal is larger than that of a wide-band signal 35 dB or more (for example, when the power of the narrow-band interference signal is close to the limit value of the interference-signal removal capacity), the interference signal amount to be extracted is suppressed so that the interference removal capacity is not controlled but the maximum interference removal is performed.

Thus, it is realized to stop removal of interference signals when the characteristic of an input signal is improved by removing no interference signal or properly suppress the interference signal amount to be extracted when the characteristic of an input signal is improved after removing interference by suppressing the interference signal amount to be extracted to a certain extent by stopping suppression of the amount of only interference signals to be extracted having the power of a predetermined magnitude or more or removing interference signals the amount of which to be extracted is suppressed in accordance with each interference signal. Therefore, it is possible to prevent the (reception) quality of an input signal from deteriorating which is conventionally caused because even a desired signal to which (reception) processing should be originally applied is removed when removing interference signals and thereby, it is possible to improve the characteristic of the bit error ratio of an input signal after interference is removed.

Moreover, in the case of an interference-signal removing apparatus of the present invention, extraction-amount suppression means suppresses the interference signal amount to be extracted by extraction means in accordance with the power of desired signals included in input signals as another mode. That is, to receive signals including CDMA signals and narrow-band interference signals, the interference signal amount to be extracted is suppressed in accordance with the reception power of the CDMA signals.

FIGS. 7A and 7B show states of removing narrow-band interference signals from reception signals including wide-band signals and the narrow-band interference signals by using the above interference-signal removing apparatus of the present invention.

Specifically, FIG. 7A shows an example in which the power of a certain narrow-band interference signal is large enough compared to the power of a wide-band signal. In this case, it is possible to improve the quality of wide-band signals after interference is removed compared to a conventional case by performing interference removal suitable for each interference signal, that is, leaving the interference-signal component of narrow-band interference signals (e.g. interference signal shown by ② in FIG. 7A) having a reception level almost equal to that of a wide-band signal without removing interference from the signals, removing interference from narrow-band interference signals (e.g. interference signal shown by ① in FIG. 7A) having a high reception level without suppressing the interference signal amount to be extracted, and removing interference from narrow-band interference signals (e.g. interference signal shown by ③ in FIG. 7A) having a comparatively low reception level while suppressing the interference signal amount to be extracted.

FIG. 7A shows three signals ①, ②, and ③ interfering with a wide-band signal, in which states of reception signals before interference is removed are shown in the left graph and states of reception signals after interference is remove are shown in the right graph. Abscissas of these graphs respectively indicate frequency and ordinates of them respectively indicate vector intensity.

FIG. 7B shows an example in which the power of each narrow-band interference signal is almost equal to the power of a wide-band signal (the same is true for the case in which the former is smaller than the latter). In this case, by leaving interference signal components of narrow-band interference signals (e.g. interference signals shown by ⑤ and ⑥ (in FIG. 7B) respectively having a reception level very close to that of a wide-band signal without removing interference but applying interference removal to narrow-band interference signals (e.g. interference signal shown by ④ in FIG. 7B) having a relatively-low reception level while suppressing the interference signal amount to be extracted, it is possible to improve the quality of wide-band signals after interference is removed compared to a conventional case (when removing all narrow-band interference signals from input reception signals).

FIG. 7(b) shows three signals ④, ⑤, and ⑥ interfering with a wide-band signal, in which states of reception signals before interference is removed are shown in the left graph and states of reception signals after interference is removed are shown in the right graph. Abscissas of these graphs respectively indicate frequency and ordinates of them respectively indicate spectrum intensity.

Moreover, in FIGS. 7A and 7B, the fall of the frequency spectrum of the wide-band signal after interference is removed shows a portion from which the wide-band signal component is removed when the interference is removed.

Thus, an interference-signal removing apparatus of the present invention makes it possible to improve the characteristic of an input signal when the power of a narrow-band interference signal is smaller than that of a wide-band desired signal by removing interference correspondingly to desired signals or interference signals included in input signals and moreover, flexibly removing interference every interference signal even when a plurality of narrow-band interference signals are included in input signals.

BRIEF DESCRIPTION OF THE DRAWINGS

FIGS. 20A and 20B are illustrations showing states of removing narrow-band interference signals from reception signals including wide-band signals and the narrow-band interference signals.

DESCRIPTION OF THE PREFERRED EMBODIMENTS

An interference-signal removing apparatus of an embodiment of the present invention is described below by referring to the accompanying drawings.

In the case of this embodiment, an interference-signal removing apparatus is set to a receiver for performing radio communication to remove narrow-band interference signals included in signals (including wide-band desired signals and the narrow-band interference signals) received by the receiver.

First, a configuration according to a technical idea common to the whole of the present invention is described below.

Figure 1:
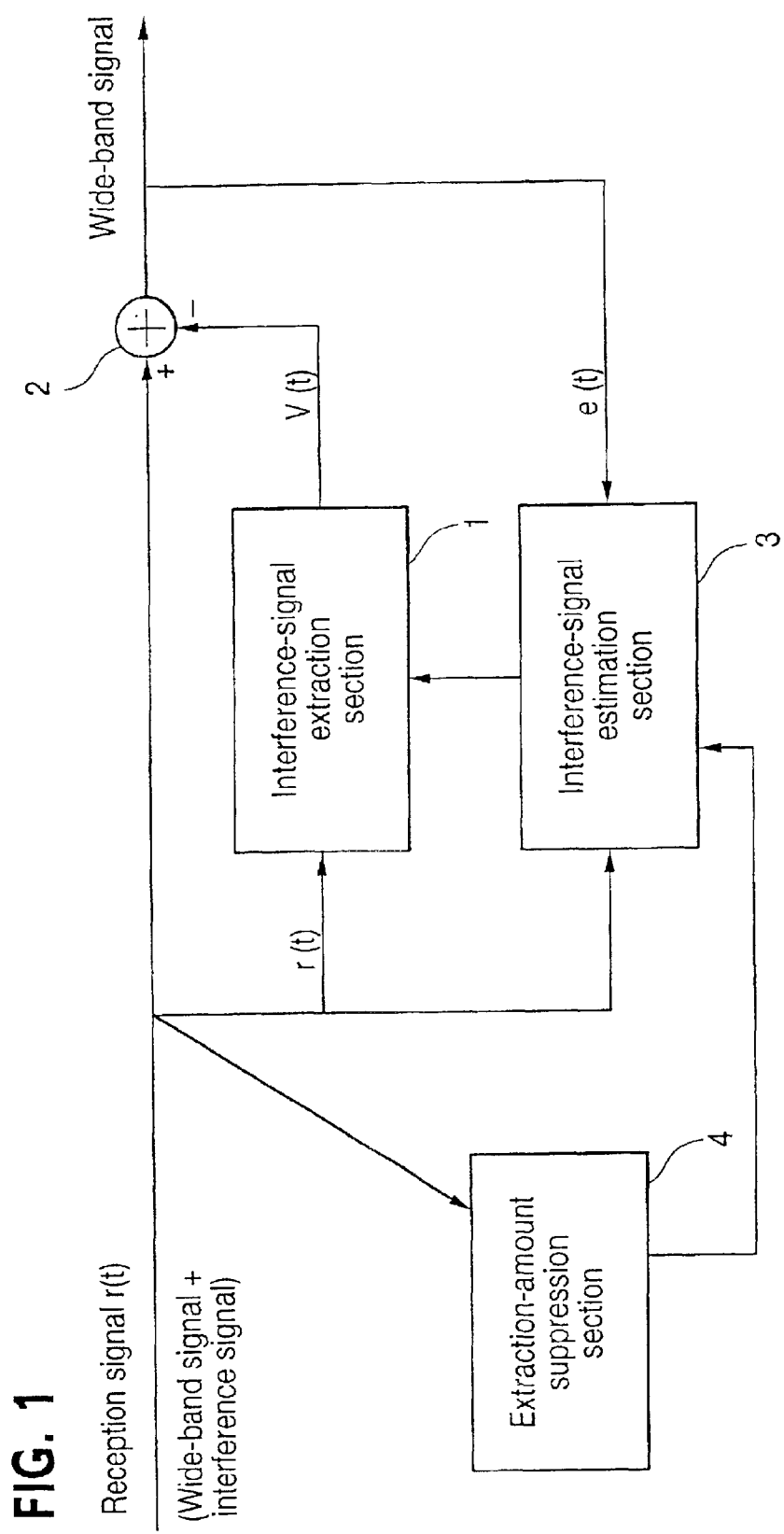
FIG. 1 is an illustration showing an interference-signal removing apparatus of the present invention.

FIG. 1 shows an interference-signal removing apparatus of the present invention, which is provided with an interference-signal extraction section 1, a synthesizer 2, an interference-signal estimation section 3, and an extraction-amount suppression section 4. Symbol t denotes time.

The interference-signal estimation section 3 inputs a reception signal r(t) in which a wide-band desired signal and a plurality of narrow-band interference signals are synthesized and a reception signal e(t) after interference is removed to estimate interference signals included in the reception signal e(t) after interference is removed and communicates the estimation result to the interference-signal extraction section 1.

The interference-signal extraction section 1 inputs a reception signal r(t) to extract an interference signal (signal regarded as an interference signal) V(t) from the reception signal r(t) in accordance with the estimation result communicated from the interference-signal estimation section 3 and outputs the interference signal V(t) to the synthesizer 2.

The synthesizer 2 synthesizes the reception signal r(t) and the interference signal V(t) output from the interference-signal extraction section 1 at an opposite phase (that is, so that the interference signal V(t) is removed from the reception signal r(t)) and outputs the reception signal e(t) from which the interference signal V(t) is removed. A part of the reception signal e(t) after interference is removed output from the synthesizer 2 is input to the above interference-signal estimation section 3 and used to estimate an interference signal.

The extraction-amount suppression section 4 inputs a reception signal r(t) and controls the interference-signal estimation section 3 so that the amount of interference signal V(t) to be extracted by the interference-signal extraction section 1 is suppressed (so that the amount of interference signal V(t) to be extracted becomes smaller than the amount of interference signal to be extracted according to the above estimation result) in accordance with the power of a desired signal or that of an interference signal included in the reception signal r(t) when the power of the interference signal is relatively small.

As described above, in the case of the interference-signal removing apparatus of this embodiment, the interference signal amount to be extracted is suppressed in interference signal removal in accordance with input signals and thereby, it is possible to suppress that even a wide-band signal is removed when the power of a narrow-band interference signal is equal to or smaller than the power of a wide-band desired signal. Therefore, the interference-signal removing apparatus of this embodiment makes it possible to improve the reception quality of an input signal (wide-band signal) after interference is removed compared to a conventional case and thereby, it is possible to improve the characteristic of a bit error ratio of an input signal (wide-band signal) after interference is removed.

For example, when a CDMA signal is used as a wide-band desired signal and an FM signal is used as a narrow-band interference signal, it is possible to improve the characteristic of a bit error ratio of a reception signal after interference is removed as the whole reception band by setting the interference-signal removing apparatus of this embodiment to a receiver because the receiver allows interference signals to remain up to the same level as CDMA signals.

In the case of this embodiment, extraction means of the present invention is constituted for the interference-signal extraction section 1, removal means of the present invention is constituted of the synthesizer 2, extraction control means of the present invention is constituted of the interference-signal estimation section 3, and extraction-amount suppression means of the present invention is constituted of the extraction-amount suppression section 4.

Various embodiments of the present invention are described below.

First, an interference-signal removing apparatus of first embodiment of the present invention is described below.

Figure 2:
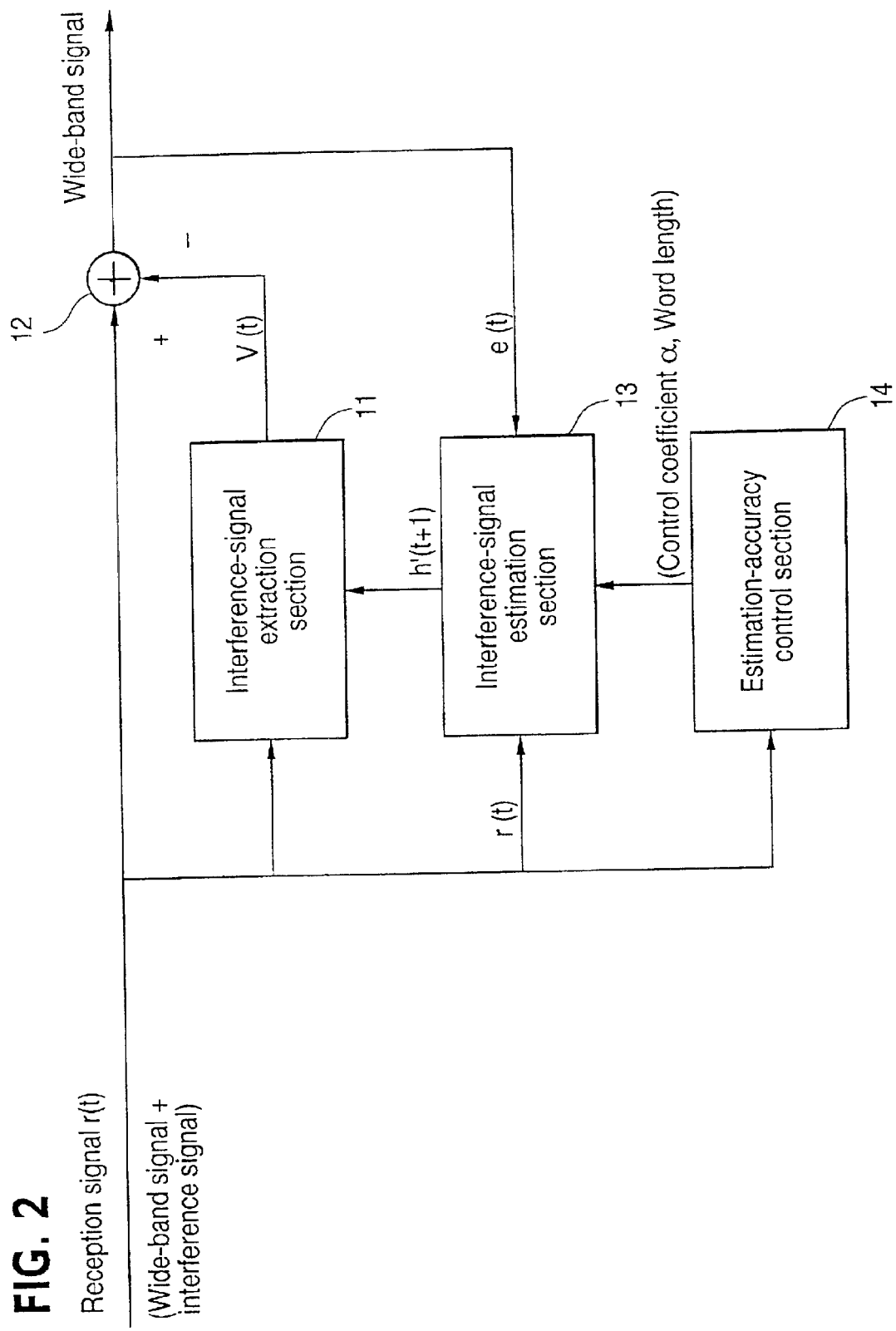
FIG. 2 is an illustration showing a configuration of the interference-signal removing apparatus of an embodiment of the present invention.

FIG. 2 shows an interference-signal removing apparatus which is provided with an interference-signal extraction section 11, a synthesizer 12, an interference-signal estimation section 13, and an estimation-accuracy control section 14. Symbol t denotes time.

The interference-signal estimation section 13 inputs a reception signal r(t) in which a wide-band desired signal and a plurality of narrow-band interference signals are synthesized and the reception signal e(t) after interference is removed, estimates interference signals included in the reception signal r(t) by using a general adaptive algorithm, and calculates the interference-signal estimation coefficient h(t+1) in accordance with the estimation result. Moreover, the interference-signal estimation section 13 of this embodiment restricts the effective word length of the calculated interference-signal estimation coefficient h(t+1) in accordance with the control by an estimation-accuracy control section 14 to be described later and outputs an interference-signal estimation coefficient h'(t+1) with the restricted effective word length thereby obtained to the interference-signal extraction section 11.

The interference-signal extraction section 11 inputs a reception signal r(t), extracts an interference signal (regarded as an interference signal) from the reception signal r(t) in accordance with the interference-signal estimation coefficient h'(t+1) input from the interference-signal estimation section 13, and outputs the interference signal V(t) to the synthesizer 12.

The synthesizer 12 synthesizes the reception signal r(t) and the interference signal V(t) output from the interference-signal extraction section 11 at an opposite phase (that is, so that the interference signal V(t) is removed from the reception signal r(t)) and outputs the reception signal e(t) from which the interference signal V(t) is removed. Moreover, a part of the reception signal e(t) after interference is removed output from the synthesizer 12 is input to the interference-signal estimation section 13 and used to estimate an interference signal.

The estimation-accuracy control section 14 inputs a reception signal r(t) and controls the effective-word-length restriction performed by the interference-signal estimation section 13 so that the amount of interference signal V(t) to be extracted is suppressed by the interference signal extraction section 11 in accordance with the power of a desired signal or the power of an interference signal included in the reception signal r(t) when the power of the interference signal is relatively small.

Figure 3:
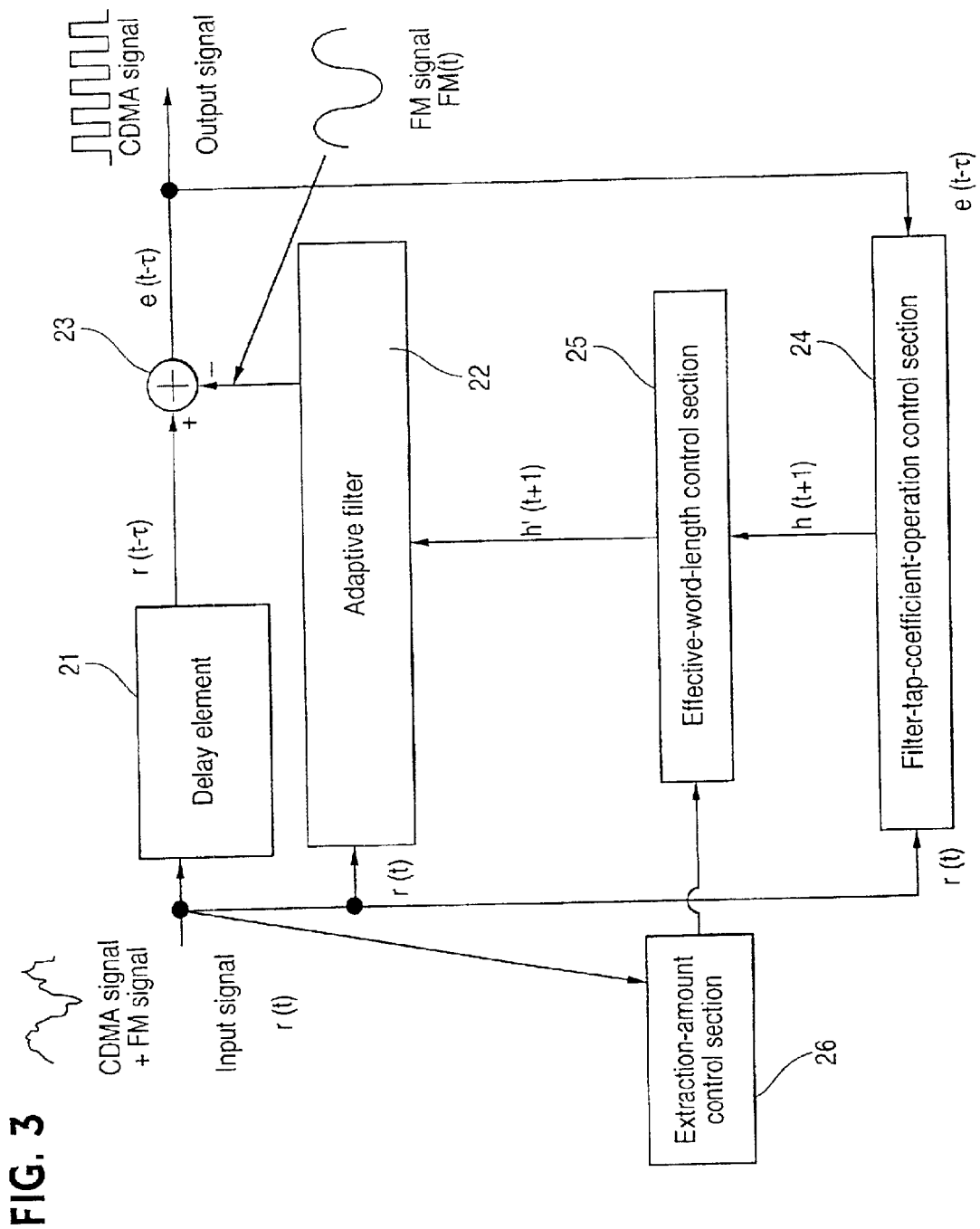
FIG. 3 is an illustration showing a configuration of the interference-signal removing apparatus of a first embodiment of the present invention.

Moreover, FIG. 3 shows a configuration of an interference-signal removing apparatus when a configuration for restricting the effective word length of the interference-signal estimation coefficient h(t+1) is applied to a CDMA receiver. The apparatus is provided with a delay element 21, an adaptive filter 22, a subtracter 23, a filter-tap-coefficient-operation control section 24, an effective-word-length control section 25, and an extraction-amount control section 26.

Figure 13:
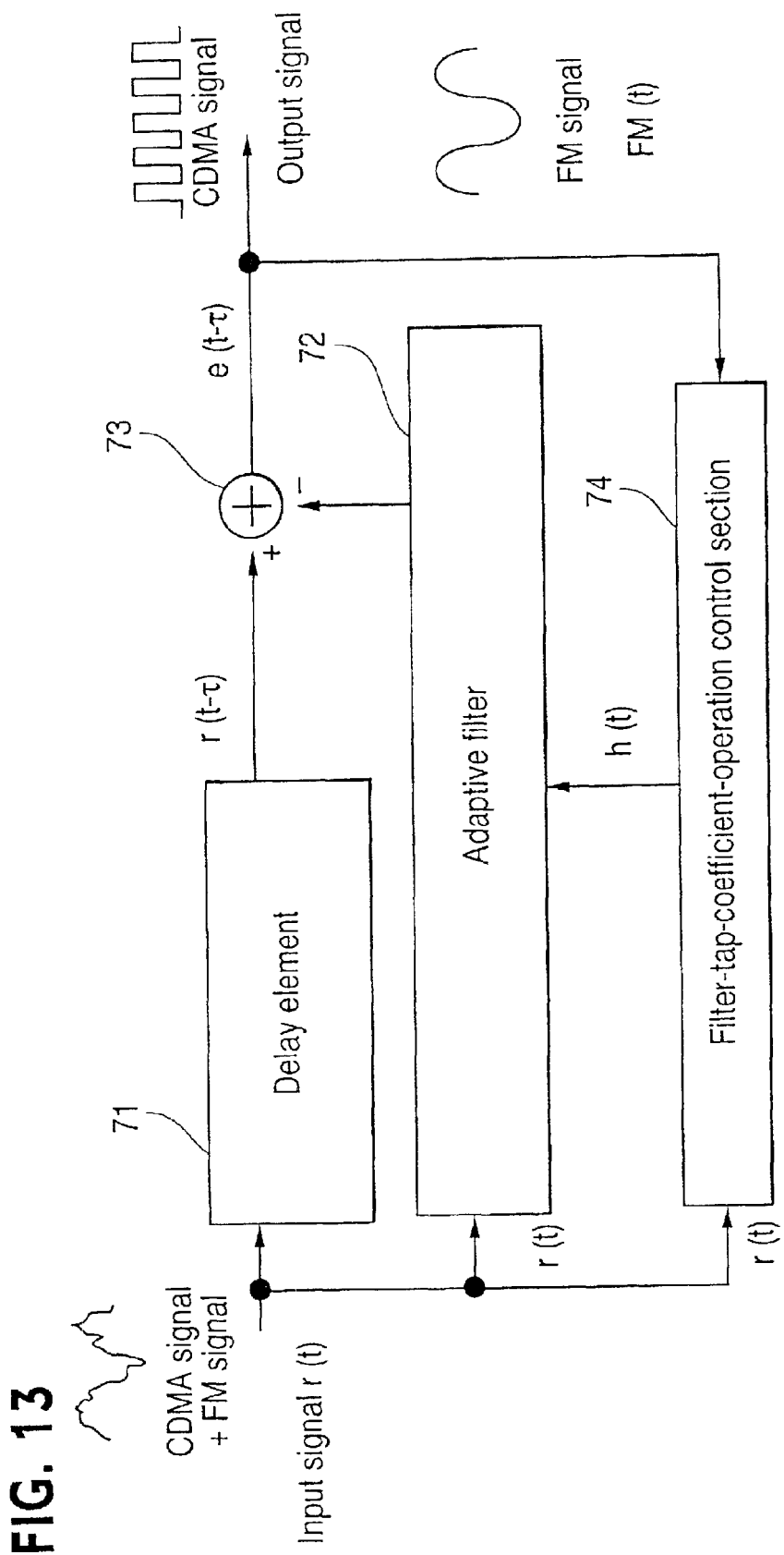
FIG. 13 is an illustration showing an interference-signal removing apparatus.
Figure 14:
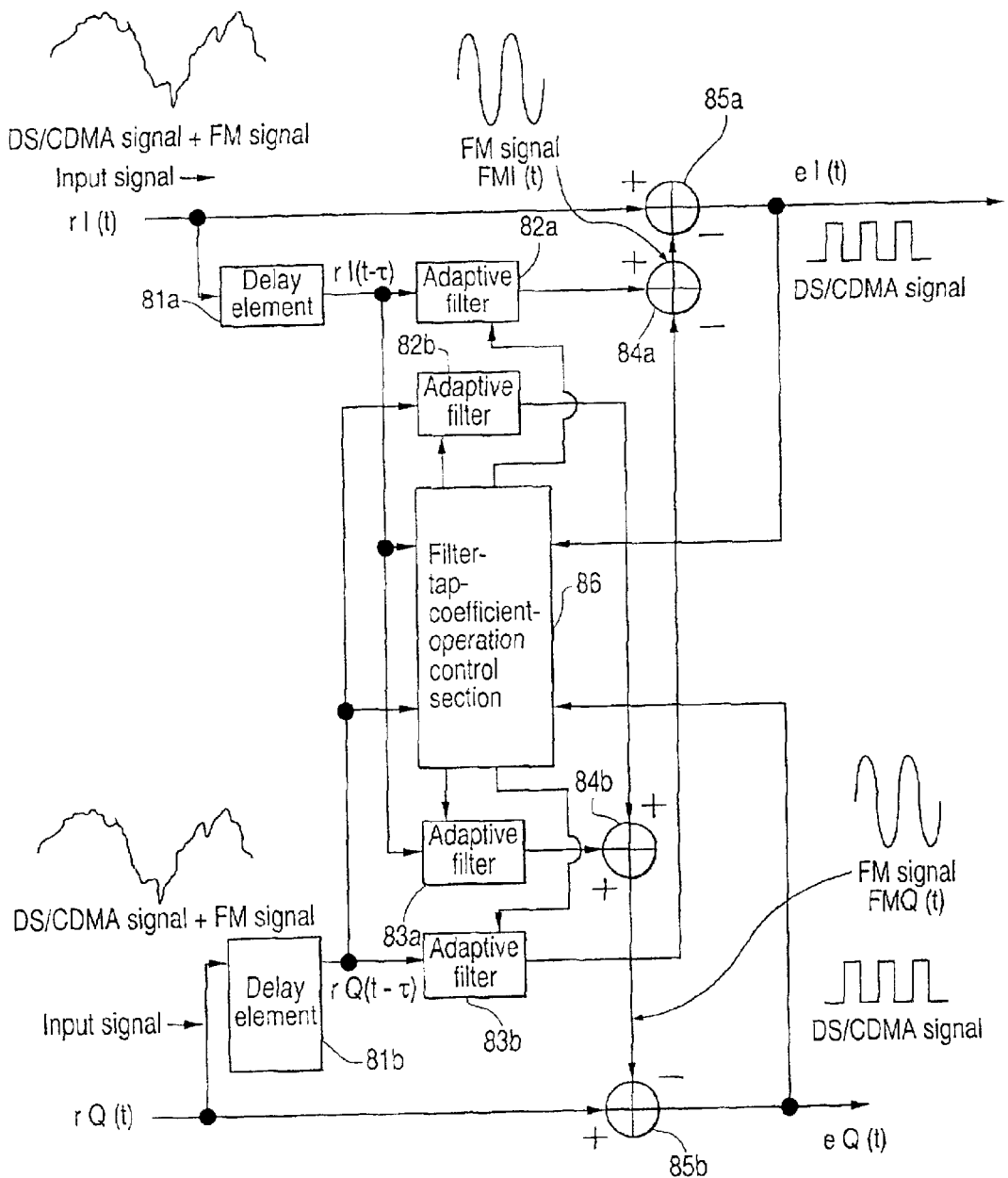
FIG. 14 is an illustration showing an interference-signal removing apparatus.
Figure 15:
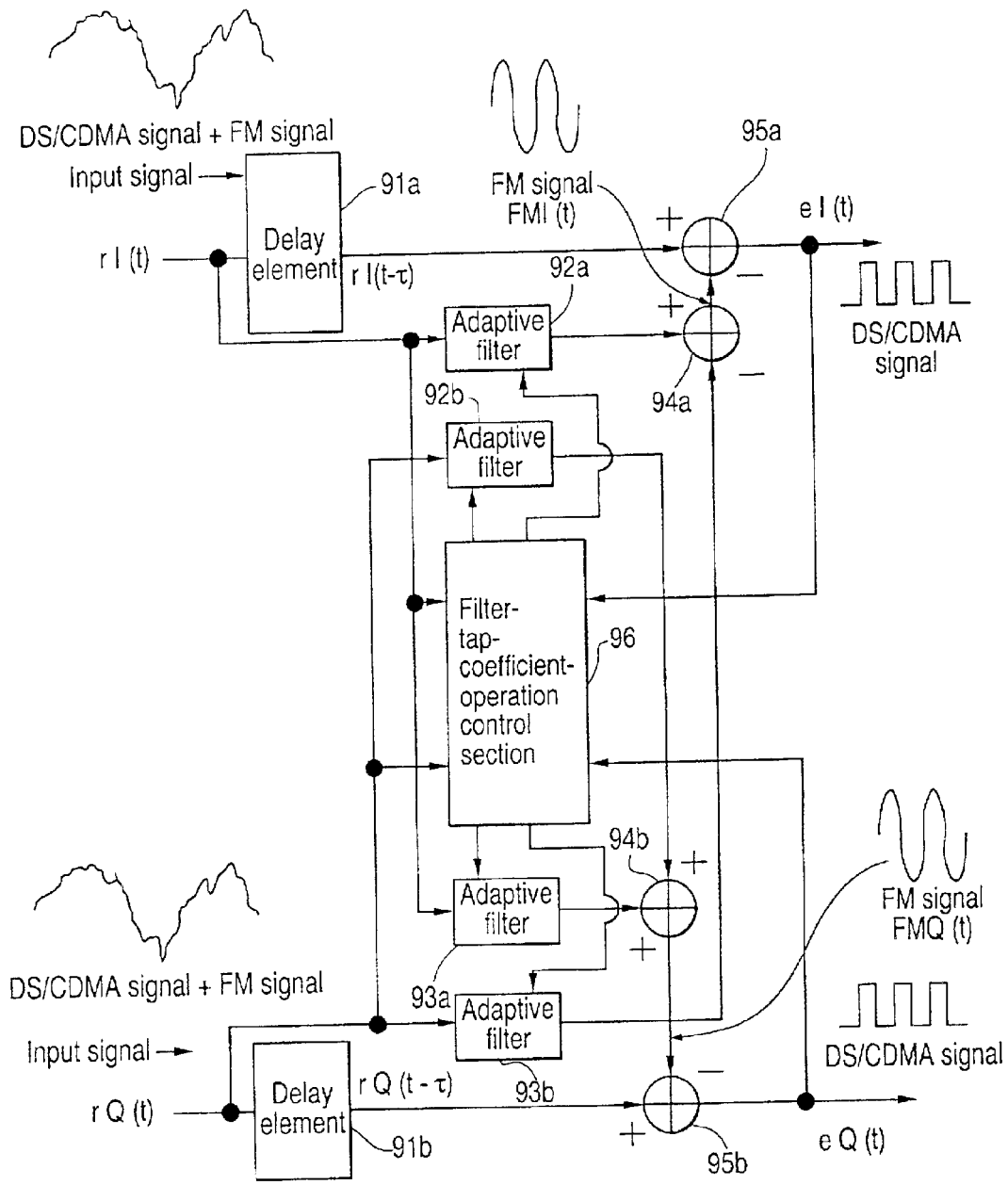
FIG. 15 is an illustration showing an interference-signal removing apparatus.

In this case, configurations and operations of the delay element 21, adaptive filter 22, subtracter 23, and filter-tap-coefficient-operation control section 24 are the same as those of symbols 71 to 74 shown in FIG. 13.

The effective-word-length control section 25 inputs the filter-tap-coefficient series h(t+1) from the filter-tap-coefficient-operation control section 24, restricts the effective word length of the filter-tap-coefficient series h(t+1) in accordance with the control by an extraction-amount control section 26 to be described later, and outputs the filter-tap-coefficient series h'(t+1) obtained through the above restriction to the adaptive filter 22.

The extraction-amount control section 26 inputs a reception signal r(t) and controls the above effective-word-length restriction performed by the effective-word-length control section 25 so that the amount of interference signal V(t) to be extracted by the adaptive filter 22 is suppressed in accordance with the power of a desired signal or that of an interference signal included in the reception signal r(t) when the power of the interference signal is relatively small.

In this case, a method for restricting the effective word length of the filter-tap-coefficient series (interference-signal estimation coefficient) h(t+1) in accordance with the (input) reception signal r(t) is described below.

In the case of this embodiment, it is assumed that the number of (digital) bits of the reception signal r(t) is 16, the number of bits of the filter-tap-coefficient series (interference-signal estimation coefficient) h(t+1) to be originally input in the adaptive filter 22 (interference-signal extraction section 11) is 16, and the number of bits of an arithmetic operation element used to compute the filter-tap-coefficient series (interference-signal estimation coefficient) h(t+1) is 32. Moreover, in the case of this embodiment, it is assumed that the step-size parameter (weighting coefficient) shown in the above expression 5 is set to 0.001 as a $\mu$ value.

The extraction-amount control section 26 (estimation-accuracy control section 14) of this embodiment detects the power difference between a wide-band desired signal and a narrow-band interference signal included in the input reception signal r(t) by spectrum-analyzing the reception signal r(t) and controls the word length of data of the filter-tap-coefficient series (interference-signal estimation coefficient) h(t+1) input to the adaptive filter 22 (interference-signal extraction section 11) as described in the following Items (1) to (6).

(1) When the power difference between a wide-band signal and a narrow-band interference signal is equal to or more than 5 dB, the word length of data is set to 0 bit (so that no interference signal is removed).

(2) When the power difference between a wide-band signal and a narrow-band interference signal is kept in a range of ±5 dB, the word length of data is set to 8 bits.

(3) When the power difference between a wide-band signal and a narrow-band interference signal is kept in a range of −5 to −15 dB, the word length of data is set to 10 bits.

(4) When the power difference between a wide-band signal and a narrow-band interference signal is kept in a range of −15 to −25 dB, the word length of data is set to 12 bits.

(5) When the power difference between a wide-band signal and a narrow-band interference signal is kept in a range of −25 to −35 dB, the word length of data is set to 14 bits.

(6) When the power difference between a wide-band signal and a narrow-band interference signal is equal to or more than −35 dB, the word length of data is set to 16 bits (so that no effective word length is restricted).

By performing the above word-length restriction, it is possible to control a signal component having a comparatively small power so that the word length of data become small and rarely extracted.

To restrict the word length of data, it is possible to use a simple method of performing AND (logical product) operation between 16-bit data and FF0 (H: hexadecimal number). Specifically, when performing AND operation between 16-bit data and FFF0, it is possible to leave the value ("1" or "0") of high-order 12 bits of the data and set all values of low-order 4 bits to "0". As a result, it is possible to restrict the word length of the data to 12 bits.

Moreover, it is considered that the influence of effective-word restriction appears on an extracted interference signal. For example, however, a transversal filter represented by a finite impulse response (FIR) filter generally used to extract an interference signal uses the collapsible sum of outputs from a plurality of delay elements. Therefore, the influence hardly appears because of the effect of averaging the delay elements.

As described above, the interference-signal removing apparatus of this embodiment restricts the effective word length of the interference-signal estimation coefficient (filter-tap-coefficient series) h(t+1) which is a result of estimating and extracting narrow-band interference signals included in input signals and control the interference signal amount to be extracted. Therefore, it is possible to perform interference removal corresponding to each interference signal and improve the quality of an input signal (wide-band signal) after interference is removed.

In the case of this embodiment, extraction means of the present invention is constituted of the interference-signal extraction section 11 (or adaptive filter 22), removal means of the present invention is constituted of the synthesizer 12 (or subtracter 23), extraction control means of the present invention is constituted of the interference-signal estimation section 13 (or filter-tap-coefficient-operation control section 24), and extraction-amount suppression means of the present invention is constituted of the estimation-accuracy control section 14 (or extraction-amount control section 26 or effective-word-length control section 25).

Moreover, in the case of this embodiment, the (reception) input-signal value r(t) corresponds to an input-signal value of the present invention, the input-signal series u(t) shown by the above expression 1 corresponds to an input vector of the present invention, the interference-signal-estimation signal (filter-tap-coefficient control signal) hi as shown in the above expression 2 corresponds to a digital control value of the present invention, and the interference-signal estimation coefficient (filter-tap-coefficient series) h(t) corresponds to a control vector of the present invention.

Then, an interference-signal removing apparatus of second embodiment of the present invention is described below.

Because the interference-signal removing apparatus of this embodiment has the same configuration as the apparatus shown in FIG. 2, it is described by referring to FIG. 2 in the case of this embodiment for convenience' sake of description.

As shown in FIG. 2, the interference-signal removing apparatus of this embodiment is provided with an interference-signal extraction section 11, a synthesizer 12, an interference-signal estimation section 13, and an estimation-accuracy control section 14. Symbol t denotes time.

In this case, configurations and operations of the interference-signal extraction section 11 and synthesizer 12 are the same as those shown for the above first embodiment.

To calculate an interference-signal estimation coefficient h(t+1) according to an estimation result of an interference signal similarly to the case of the first embodiment, the interference-signal estimation section 13 of this embodiment restricts the effective word length of an arithmetic operation element used for the above calculation in accordance with the control by an estimation-accuracy control section 14 to be described later and outputs an interference-signal estimation coefficient h'(t+1) calculated by using the arithmetic operation element after the effective word length is restricted to the interference-signal extraction section 11.

The estimation-accuracy control section 14 inputs a reception signal r(t) and controls the above effective-word-length restriction performed by the interference-signal estimation section 13 so that the amount of interference signal V(t) to be extracted by the interference-signal extraction section 11 is suppressed in accordance with the power of a desired signal or an interference signal included in the reception signal r(t) when the power of the interference signal is relatively small.

Then, a method of restricting the effective word length of an arithmetic operation element in accordance with the (input) reception signal r(t) is described below.

In the case of this embodiment, it is assumed that the number of (digital) input bits of the reception signal r(t) is 16, the number of bits of the interference-signal estimation coefficient h'(t+1) input to the interference-signal extraction section 11 is 16, and the number of bits of an original arithmetic operation element used to compute the interference-signal estimation coefficient h'(t+1) is 32. Moreover, in the case of this embodiment, it is assumed that the value of the step size parameter μ (weighting coefficient) shown in the expression 5 is set to 0.001.

The estimation-accuracy control section 14 of this embodiment detects the power difference between a wide-band desired signal and a narrow-band interference signal included in the input reception signal r(t) by spectrum-analyzing the reception signal r(t) and controls the word length of an arithmetic operation element (e.g. operation word length of operator of LMS or RLS) used by the interference-signal estimation section 13 in accordance with the detected power difference (for example, so as to be proportioned in accordance with the power difference) as shown in the following Items (1) to (6).

(1) When the power difference between a wide-band signal and a narrow-band interference signal is 5 dB or more, the word length of an operator is set to 0 bit (so that no interference signal is removed).

(2) When the power difference between a wide-band signal and a narrow-band interference signal is kept in a range of 5 dB, the word length of an operator is set to 24 bits.

(3) When the power difference between a wide-band signal and a narrow-band interference signal is kept in a range of −5 to −15 dB, the word length of an operator is set to 26 bits.

(4) When the power difference between a wide-band signal and a narrow-band interference signal is kept in a range of −15 to −25 dB, the word length of an operator is set to 28 bits.

(5) When the power difference between a wide-band signal and a narrow-band interference signal is kept in a range of −25 to −35 dB, the word length of an operator is set to 30 bits.

(6) When the power difference between a wide-band signal and a narrow-band interference signal is −35 dB or more, the word length of an operator is set to 32 bits (so that no effective word length is restricted).

By performing the above word-length restriction, it is possible to perform control so that the word length of an operator is decreased for a signal component having a comparatively small power and is rarely extracted.

For example, by controlling the effective word length of the reception signal r(t) or the reception signal e(t) after interference is removed input to the interference-signal estimation section 13 and used for operation of the interference-signal estimation coefficient h'(t+1), it is possible obtain the same advantage as the above.

Moreover, to restrict the word length of an operator, it is possible to use a simple method of performing AND (logical product) operation between a 32-bit operator and FFFFFFF0: (H: hexadecimal number). Specifically, by performing AND operation between a 32-bit operator and FFFFFFF0, it is possible to leave the value ("1" or "0") of high-order 28 bits of the data concerned and set all values of low-order 4 bits to "0". As a result, it is possible to restrict the word length of the data to 28 bits.

As described above, the interference-signal removing apparatus of this embodiment controls the interference signal amount to be extracted by restricting the effective word length of an arithmetic operation element used to estimate and extract narrow-band interference signals included in input signals. Therefore, it is possible to perform interference removal corresponding to each interference signal and improve the quality of an input signal (wide-band signal) after interference is removed.

In the case of this embodiment, extraction means of the present invention is constituted of the interference-signal extraction section 11, removal means of the present invention is constituted of the synthesizer 12, extraction control means of the present invention is constituted of the interference-signal estimation section 13, and extraction-amount suppression means of the present invention is constituted of the estimation-accuracy control section 14.

Moreover, in the case of this embodiment, the (reception) input signal value r(t) corresponds to an input signal value of the present invention, the inputs signal series u(t) shown by the expression 1 corresponds to an input vector of the present invention, the interference-signal estimation signal hi shown by the above expression 2 corresponds to a control value of the present invention, and the interference-signal estimation coefficient h(t) corresponds to a control vector of the present invention.

Furthermore, in the case of this embodiment, an operator realized by the above arithmetic operation element corresponds to a digital operator of the present invention.

Then, an interference-signal removing apparatus of third embodiment of the present invention is described below.

Because the interference-signal removing apparatus of the third embodiment has the same configuration as the apparatus shown in FIG. 2, this embodiment is described by referring to FIG. 2 for convenience's sake of description.

As shown in FIG. 2, the interference-signal removing apparatus of this embodiment is provided with an interference-signal extraction section 11, a synthesizer 12, an interference-signal estimation section 13, and an estimation-accuracy control section 14. Symbol t denotes time.

In this case, configurations and operations of the interference-signal extraction section 11 and synthesizer 12 are the same as the case of the first embodiment.

To calculate an interference-signal estimation coefficient h(t+1) according to an estimation result of an interference signal similarly to the case of the first embodiment, the interference-signal estimation section 13 of this embodiment multiplies the calculated interference-signal estimation coefficient h(t+1) by a control coefficient α (in the case of this embodiment, a positive value of 1 or less) and outputs the multiplication result h'(t+1)=a*h(t+1) to the interference-signal extraction section 11 in accordance with the control of the estimation-accuracy control section 14 described later.

In the case of this embodiment, because the above multiplication of the control coefficient α is performed, the effective-word length of the interference-signal estimation coefficient h(t+1) and that of an arithmetic operation element are not restricted but these word lengths are respectively fixed to a constant value.

The estimation-accuracy control section 14 inputs a reception signal r(t) and controls the value of the control coefficient α used by the interference-signal estimation section 13 so that the amount of interference signal V(t) to be extracted by the interference-signal extraction section 11 is suppressed in accordance with the power of a desired signal or that of an interference signal included in the reception signal r(t) when the power of the interference signal is relatively small.

Figure 4:
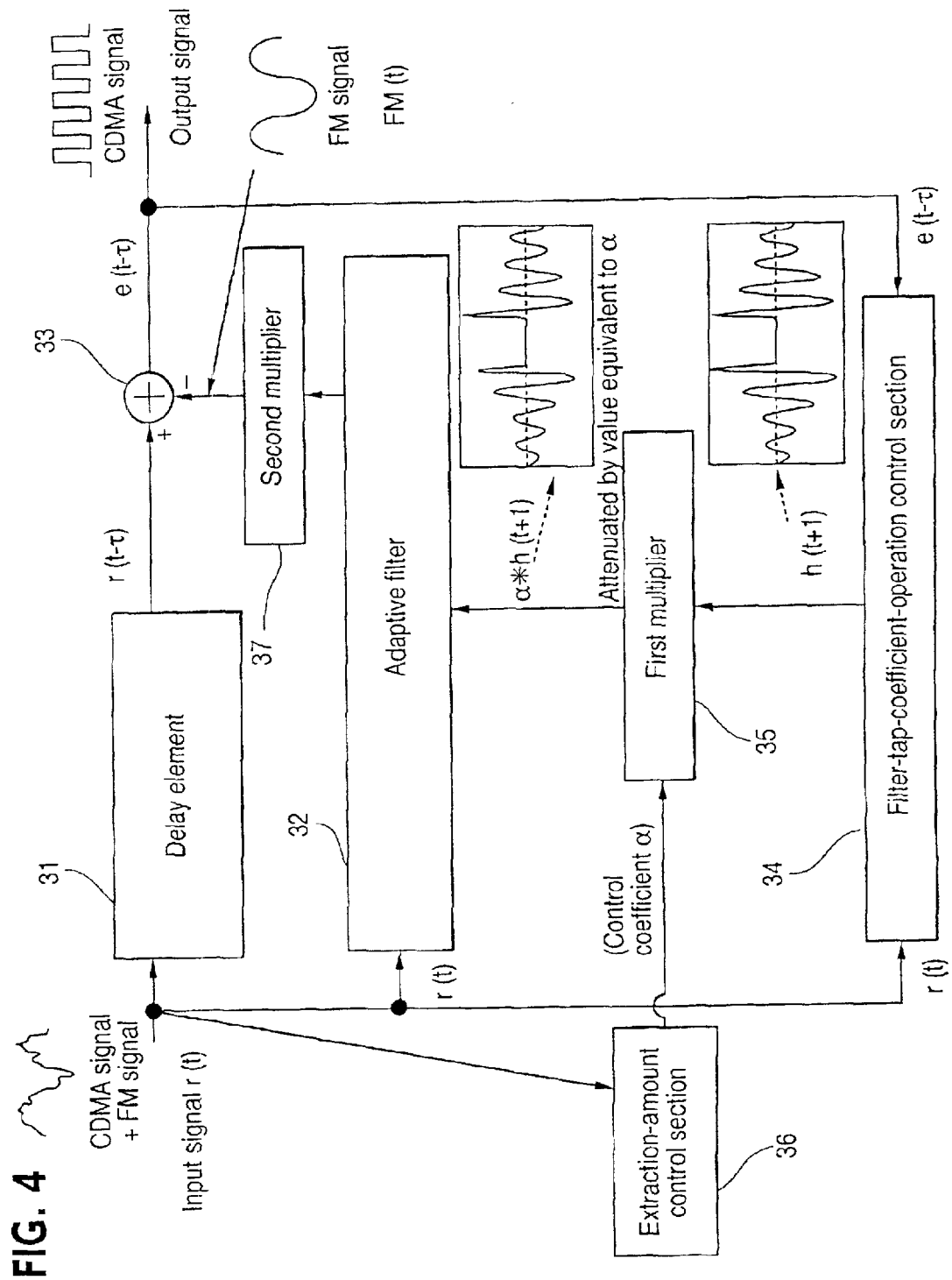
FIG. 4 is an illustration showing a configuration of the interference-signal removing apparatus of a third embodiment of the present invention.

FIG. 4 shows a configuration of an interference-signal removing apparatus when a configuration for multiplying the interference-signal estimation coefficient h(t+1) by the control coefficient α is applied to a CDMA receiver. The apparatus is provided with a delay element 31, an adaptive filter 32, a subtracter 33, a filter-tap-coefficient-operation control section 34, a first multiplier 35, an extraction-amount control section 36, and a second multiplier 37.

In this case, configurations and operations of the delay element 31, adaptive filter 32, subtracter 33, and filter-tap-coefficient control section 34 are the same as those of symbols 71 to 74 shown in FIG. 13.

The first multiplier 35 receives the filter-tap-coefficient series h(t+1) from the filter-tap-coefficient-operation control section 34, multiplies the filter-tap-coefficient series h(t+1) by the control coefficient α set in accordance with the control by an extraction-amount control section 36 to be described later, and outputs thereby-obtained filter-tap-coefficient series h'(t+1) after the above multiplication to the adaptive filter 32.

The extraction-amount control section 36 inputs a reception signal r(t) and controls the value of the control coefficient α used by the first multiplier 35 so that the amount of interference signal V(t) to be extracted by the adaptive filter 32 is suppressed in accordance with the power of a desired signal or the power of an interference signal included in the reception signal r(t) when the power of the interference signal is comparatively small.

Moreover, this embodiment is provided with the second multiplier 37 as described above. The second multiplier 37 multiplies the interference signal V(t) output from the adaptive filter 37 by a predetermined value β and outputs the multiplication result (β*V(t)) to the subtracter 33 as an object to be subtracted from the reception signal r(t).

That is, in the case of this embodiment, the interference signal V(t) extracted by the adaptive filter 32 is also multiplied by α because the filter-tap-coefficient series h(t+1) is multiplied by the control coefficient α equal to or less than 1. Therefore, the configuration of this embodiment makes it possible to suppress deterioration of the level of the interference signal V(t) by multiplying the interference signal V(t) by a predetermined value β by the second multiplier 37 and controlling the level of the interference signal V(t). For example, by setting the predetermined value β to 1/α, the level of the extracted interference signal V(t) is corrected to the original level (when the filter-tap-coefficient series h(t+1) is not multiplied by the control coefficient α) by the second multiplier 37.

In this case, a method of multiplying the filter-tap-coefficient series (interference-signal estimation coefficient) h(t+1) by the control coefficient α in accordance with the (input) reception signal r(t) is described below.

In the case of this embodiment, it is assumed that the number of (digital) input bits of the reception signal r(t) is 16, the number of bits of the filter-tap-coefficient series (interference-signal estimation coefficient) h'(t+1) input to the adaptive filter 32 (interference-signal extraction section 11) is 16, and the number of bits of an arithmetic operation element used to compute the filter-tap-coefficient series (interference-signal estimation coefficient) h(t+1) is 32. Moreover, in the case of this embodiment, it is assumed that the value of the step size parameter (weighting coefficient) $\mu$ shown in the above expression 5 is set to 0.001.

The extraction-amount control section 36 (estimation-accuracy control section 14) of this embodiment detects the power difference between a wide-band desired signal and a narrow-band interference signal included in the input reception signal r(t) by spectrum-analyzing the reception signal r(t) and controls the value of the control coefficient α used by the first multiplier 35 as shown by the following Items (1) to (6) in accordance with the detected power difference (for example, so as to be proportioned correspondingly to the power difference).

(1) When the power difference between a wide-band signal and a narrow-band interference signal is 5 dB or more, the value of the control coefficient α is set to 0 (α=0) (so that no interference signal is removed).

(2) When the power difference between a wide-band signal and a narrow-band interference signal is kept within ±5 dB, the value of the control coefficient α is set to 0.0625 (α=0.0625).

(3) When the power difference between a wide-band signal and a narrow-band interference signal is kept in a range of −5 to −15 dB, the value of the control coefficient a is set to 0.125 (α=0.125).

(4) When the power difference between a wide-band signal and a narrow-band interference signal is kept in a range of −15 to −25 dB, the value of the control coefficient α is set to 0.25 (α=0.25).

(5) When the power difference between a wide-band signal and a narrow-band interference signal is kept in a range of −25 to −35 dB, the value of the control coefficient α is set to 0.5 (α=0.5).

(6) When the power difference between a wide-band signal and a narrow-band interference signal is −35 dB or more, the value of the control coefficient α is set to 1 (α=1) (that is, the interference signal amount to be extracted is not controlled).

By controlling the value of the control coefficient α, it is realized that a signal component having a comparatively large power is extracted as an interference signal component and removed while a signal component having a comparatively small power is not estimated as an interference signal or the interference signal amount to be extracted is decreased even if the component is estimated.

Specifically, the power level of the correlation function (interference signal) V(t) extracted by the adaptive filter 32 (interference-signal extraction section 11) is suppressed proportionally to an attenuation generated due to the multiplication of the above control coefficient α. Then, when interference signal removal is continued for a certain time and the error signal e(t) becomes small, the increase of the filter-tap-coefficient series (interference-signal estimation coefficient) h'(t+1) updated by the filter-tap-coefficient-operation control section 34 (interference-signal estimation section 13) and supplied to the adaptive filter 32 (interference-signal extraction section 11) decreases to almost zero due to the effect of the control coefficient α and the value of the filter-tap-coefficient series (interference-signal estimation coefficient) h'(t+1) is balanced at a certain degree.

Therefore, by optimizing the value of the control coefficient α so that the value of the filter-tap-coefficient series (interference-signal estimation coefficient) h'(t+1) is kept constant when the power of, for example, a narrow-band interference signal is attenuated up to the same level as the power of a wide-band signal, that is, the increase of the filter-tap-coefficient series (interference-signal estimation coefficient) h(t+1) due to update is equal to the attenuation of the control coefficient α, it is possible to suppress that wide-band signals are removed together with interference signals. Therefore, even when some time elapses after interference signal removal is started, it is possible to improve the bit error ratio of an input signal (wide-band signal) after interference is removed without greatly deteriorating the interference removal capacity.

For this embodiment, a configuration is shown which controls the value of the control coefficient α in accordance with the power difference between a wide-band signal and a narrow-band interference signal. However, it is also possible to obtain the same advantage as the above by controlling the value of the control coefficient α so that the value is proportional to the power of, for example, a wide-band signal.

As described above, when estimating and extracting narrow-band interference signals included in input signals, the interference-signal removing apparatus of this embodiment controls the interference signal amount to be extracted by multiplying the interference-signal estimation coefficient (filter-tap-coefficient series) h(t+1) which is the above estimation result by the control coefficient α. Therefore, it is possible to perform interference removal corresponding to each interference signal and improve the quality of an input signal (wide-band signal) after interference is removed.

In the case of this embodiment, extraction means of the present invention is constituted of the interference-signal extraction section 11 (or the adaptive filter 32), removal means of the present invention is constituted of the synthesizer 12 (or the subtracter 33), extraction control means of the present invention is constituted of the interference-signal estimation section 13 (or the filter-tap-coefficient-operation control section 34), and extraction-amount suppression means of the present invention is constituted of the estimation-accuracy control section 14 (or the extraction-amount control section 36 or first multiplier 35).

Moreover, in the case of this embodiment, the (reception) input signal r(t) corresponds to an input signal value of the present invention, the input signal series u(t) shown by the expression 1 corresponds to an input vector of the present invention, the interference-signal estimation signal (filter-tap-coefficient control signal) hi shown by the expression 2 corresponds to a control value of the present invention, and the interference-signal estimation coefficient (filter-tap-coefficient series) h(t) corresponds to a control vector of the present invention.

Furthermore, in the case of this embodiment, the above control coefficient α corresponds to a control coefficient (to be multiplied by a control vector) of the present invention.

Next, an interference-signal removing apparatus of a fourth embodiment of the present invention is described below.

The interference-signal removing apparatus of this embodiment has the same configuration as the apparatus shown in FIG. 2. Therefore, the apparatus of this embodiment is described by referring to FIG. 2 for convenience' sake of description.

As shown in FIG. 2, the interference-signal removing apparatus of this embodiment is provided with an interference-signal extraction section 11, a synthesizer 12, an interference-signal estimation section 13, and an estimation-accuracy control section 14. Symbol t denotes time.

In this case, configurations and operations of the interference-signal extraction section 11 and synthesizer 12 are the same as those shown for the first embodiment.

When calculating an interference-signal estimation coefficient h'(t+1) according to an estimation result of a interference signal similarly to the case of the first embodiment, the interference-signal estimation section 13 of this embodiment uses a result h"(t)=α*h'(t) of multiplying the last-time interference-signal estimation coefficient h'(t) by the control coefficient α (positive value of 1 or less in the case of this embodiment) in order to calculate the next-time (updated) interference-signal estimation coefficient h'(t+1) in accordance with the control by an estimation-accuracy control section 14 to be described later. Moreover, the interference-signal estimation section 13 of this embodiment outputs the interference-signal estimation coefficient h'(t+1)=α*h'(t)+ μ*e(t)*u(t) thus updated to the interference-signal extraction section 11.

In the case of this embodiment, because the above multiplication of the control coefficient α is performed, the effective word length of the interference-signal estimation coefficient h'(t+1) and that of an arithmetic operation element are not restricted and these word lengths are respectively fixed to a constant value.

The estimation-accuracy control section 14 inputs a reception signal r(t) and controls the control coefficient a used by the interference-signal estimation section 13 so that the amount of interference signal V(t) to be extracted by the interference-signal extraction section 11 is suppressed in accordance with the power of a desired signal or that of an interference signal included in the reception signal r(t) when the power of the interference signal is comparatively small.

Figure 5:
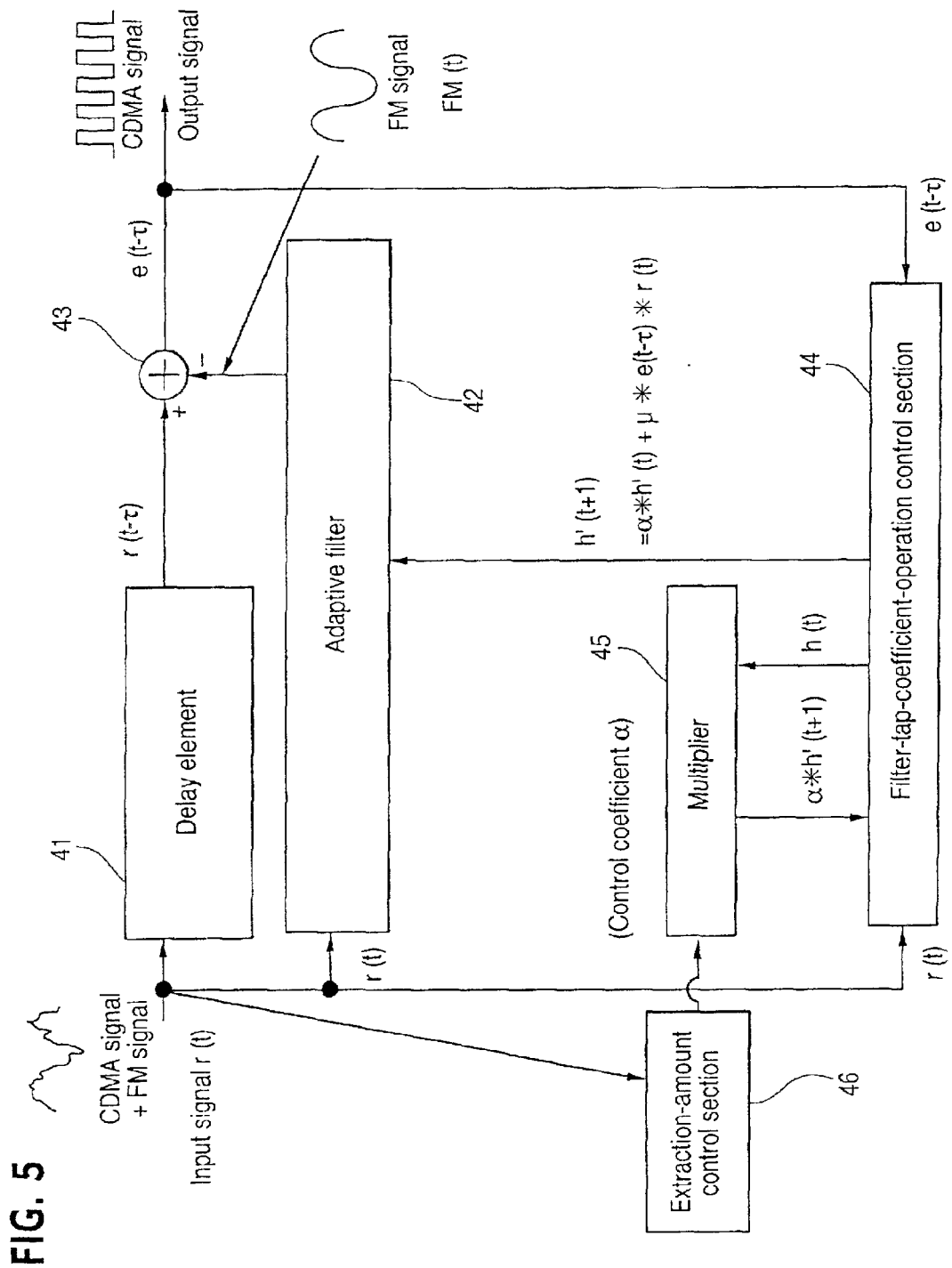
FIG. 5 is an illustration showing a configuration of the interference-signal removing apparatus of a fourth embodiment of the present invention.

FIG. 5 shows a configuration of an interference-signal removing apparatus when a configuration for multiplying the last-time interference-signal estimation coefficient h'(t) by the control coefficient α and calculating the next-time interference-signal estimation coefficient h'(t+1) is applied to a CDMA receiver. The interference-signal removing apparatus is provided with a delay element 41, an adaptive filter 42, a subtracter 43, a filter-tap-coefficient-operation control section 44, a multiplier 45, and an extraction-amount control section 46.

Configurations and operations of the delay element 41, adaptive filter 42, and subtracter 43 are the same as those of symbols 71 to 74 shown in FIG. 13.

When calculating the next-time filter-tap-coefficient series h'(t+1), the filter-tap-coefficient-operation control section 44 of this embodiment outputs the last-time filter-tap-coefficient series h'(t) to a multiplier 45 to be described later and uses a value α*h'(t) thereby input from the multiplier 45 for calculation of the next-time filter-tap-coefficient series h'(t+1).

The multiplier 45 inputs a filter-tap-coefficient series h'(t) from the filter-tap-coefficient-operation control section 44, multiplies the filter-tap-coefficient series h'(t) by the control coefficient α set in accordance with the control by an extraction-amount control section 46 to be described later, and outputs a thereby-obtained filter-tap-coefficient series α*h'(t) after the above multiplication to the filter-tap-coefficient-operation control section 44. The above multiplication is completed before the next-time filter-tap-coefficient series h'(t+1) is updated by the filter-tap-coefficient-operation control section 44.

The extraction-amount control section 46 inputs a reception signal r(t) and controls the value of the control coefficient α used by the multiplier 45 so that the amount of interference signal V(t) to be extracted by the adaptive filter 42 is suppressed in accordance with the power of a desired signal or that of an interference signal included in the reception signal r(t) when the power of the interference signal is relatively small.

In this case, a method for multiplying the last-time filter-tap-coefficient series (interference-signal estimation coefficient) h'(t) by the control coefficient α in accordance with the (input) reception signal r(t) is described below.

In the case of this embodiment, it is assumed that the number of (digital) input bits of the reception signal r(t) is 16, the number of bits of the filter-tap-coefficient series (interference-signal estimation coefficient) h'(t+1) input to the adaptive filter 42 (interference-signal extraction section 11) is 16, and the number of bits of an arithmetic operation element used to compute the filter-tap-coefficient series (interference-signal estimation coefficient) h'(t+1) is 32. Moreover, in the case of this embodiment, the step size parameter (weighting coefficient) $\mu$ shown in the expression 5 is set to 0.001.

The extraction-amount control section 46 (estimation-accuracy control section 14) of this embodiment spectrum-analyzes an input reception signal r(t) and thereby detects the power difference between a wide-band desired signal and a narrow-band interference signal included in the reception signal r(t) and controls the value of the control coefficient $\alpha$ used by the multiplier 45 as described in the following Items (1) to (6) in accordance with the detected power difference (so as to be proportioned in accordance with the power difference).

(1) When the power difference between a wide-band signal and a narrow-band interference signal is 5 dB or more, the value of the control coefficient $\alpha$ is set to 0 ($\alpha$=0) (so that no interference signal is removed).

(2) When the power difference between a wide-band signal and a narrow-band interference signal is kept within ±5 dB, the value of the control coefficient $\alpha$ is set to 0.96 ($\alpha$=0.96).

(3) When the power difference between a wide-band signal and a narrow-band interference signal is kept in a range of −5 to −15 dB, the value of the control coefficient $\alpha$ is set to 0.97 ($\alpha$=0.97).

(4) When the power difference between a wide-band signal and a narrow-band interference signal is kept in a range of −15 to −25 dB, the value of the control coefficient $\alpha$ is set to 0.98 ($\alpha$=0.98).

(5) When the power difference between a wide-band signal and a narrow-band interference signal is kept in a range of −25 to −35 dB, the value of the control coefficient $\alpha$ is set to 0.99 ($\alpha$=0.99).

(6) When the power difference between a wide-band signal and a narrow-band interference signal is −35 dB or more, the value of the control coefficient $\alpha$ is set to 1 ($\alpha$=1) (that is, the interference signal amount to be extracted is not controlled).

By controlling the value of the control coefficient $\alpha$, it is realized that a signal component having a comparatively large power is extracted and removed as an interference signal component while a signal component having a comparatively small power is not estimated as an interference signal or the interference signal amount to be extracted is decreased even if the signal component is estimated.

Specifically, because the update operation of the filter-tap-coefficient series (interference-signal estimation coefficient) h'(t+1) is performed by using the filter-tap-coefficient series (interference-signal estimation coefficient) h'(t), it is possible to regard the current coefficient series h'(t+1) as a result of accumulating the past coefficient series. Moreover, it is considered that the conventional attenuation of a wide-band signal with time (that is, a problem of the present invention) lies in the fact that signal components extracted in the past are accumulated. Therefore, this embodiment makes it possible to prevent a wide-band signal from attenuating by multiplying the last-time filter-tap-coefficient series (interference-signal estimation coefficient) h'(t) by the control coefficient $\alpha$ and suppressing the information about signal components extracted in the past.

Figure 6:
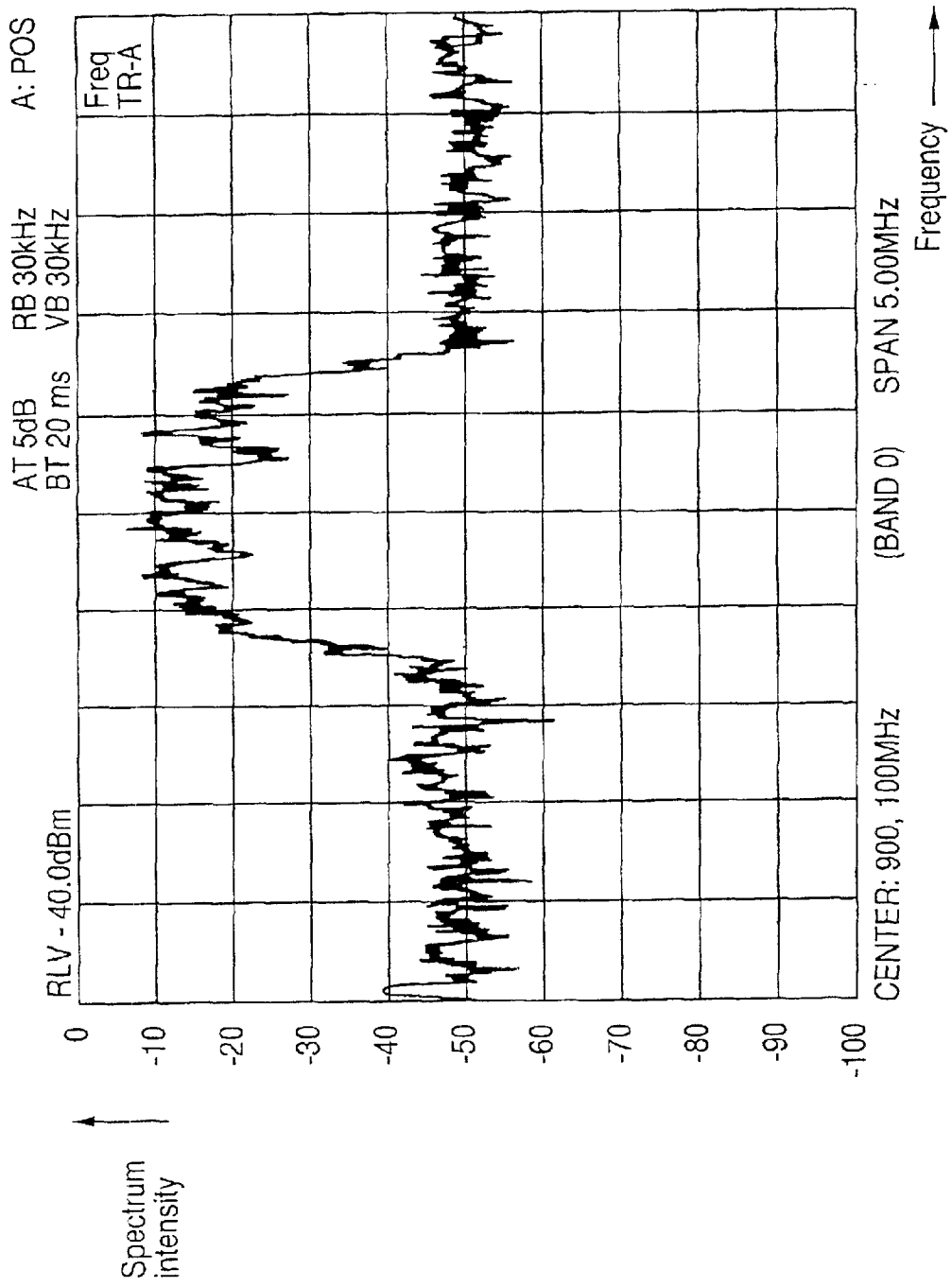
FIG. 6 is an illustration showing a spectrum of a signal output from an interference-signal removing apparatus when some time passes after a start of interference-signal removal.
Figure 7:
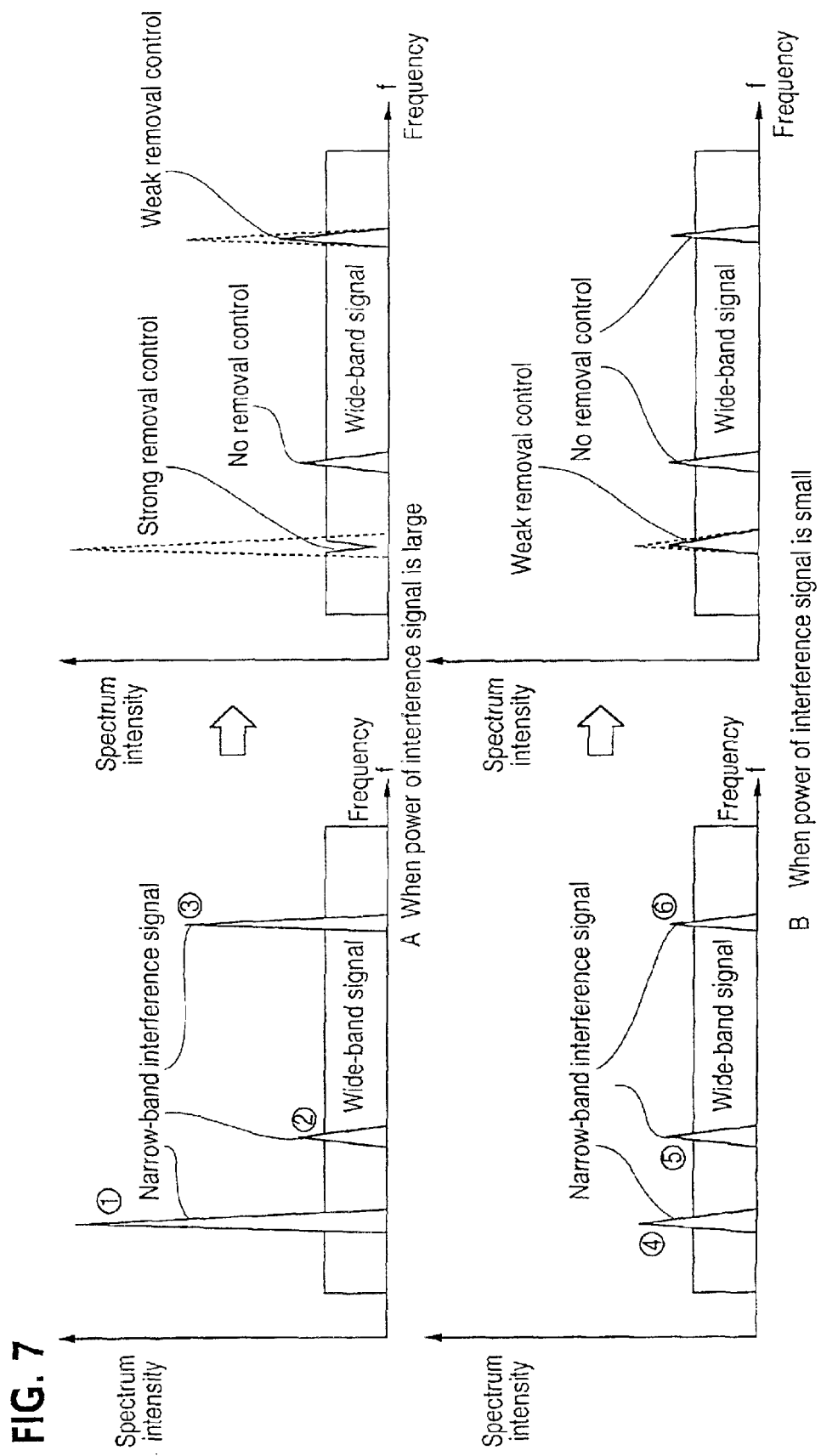
FIGS. 7A and 7B are illustrations showing states of removing narrow-band interference signals from reception signals including wide-band signals and the narrow-band interference signals by using an interference-signal removing apparatus of the present invention.
Figure 8:
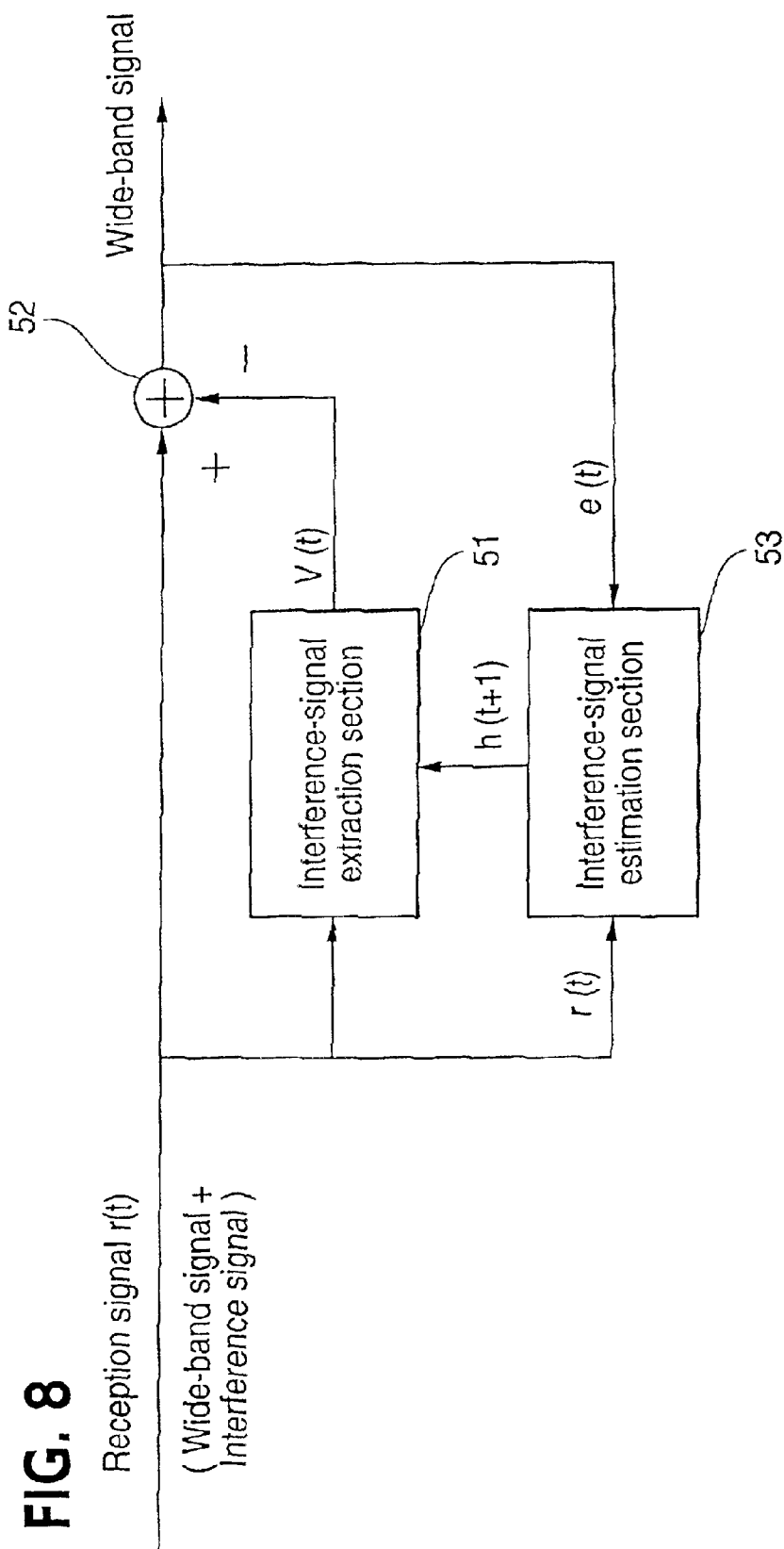
FIG. 8 is an illustration showing a conventional interference-signal removing apparatus.
Figure 9:
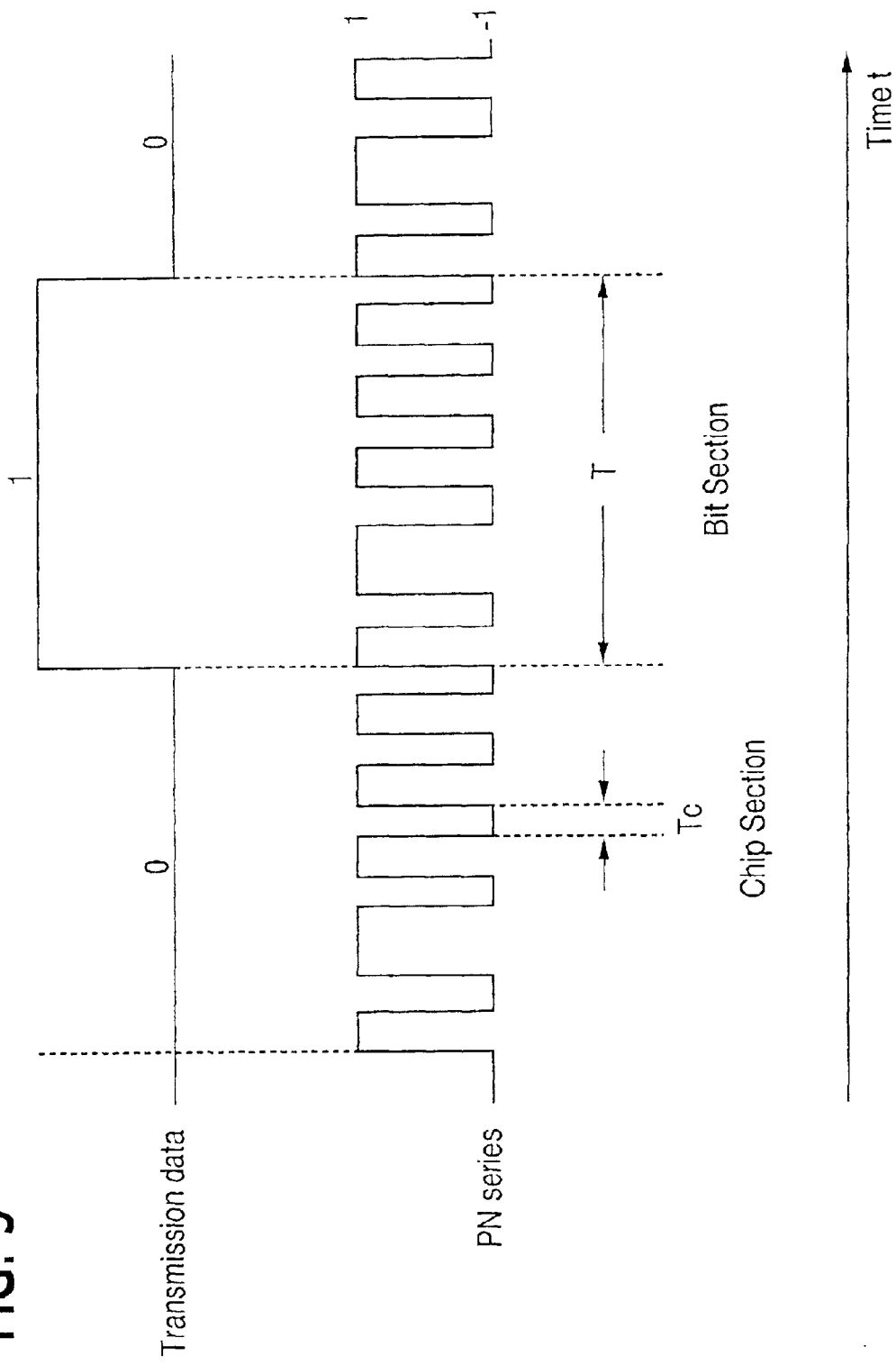
FIG. 9 is an illustration for explaining a diffusion-code series.
Figure 10:
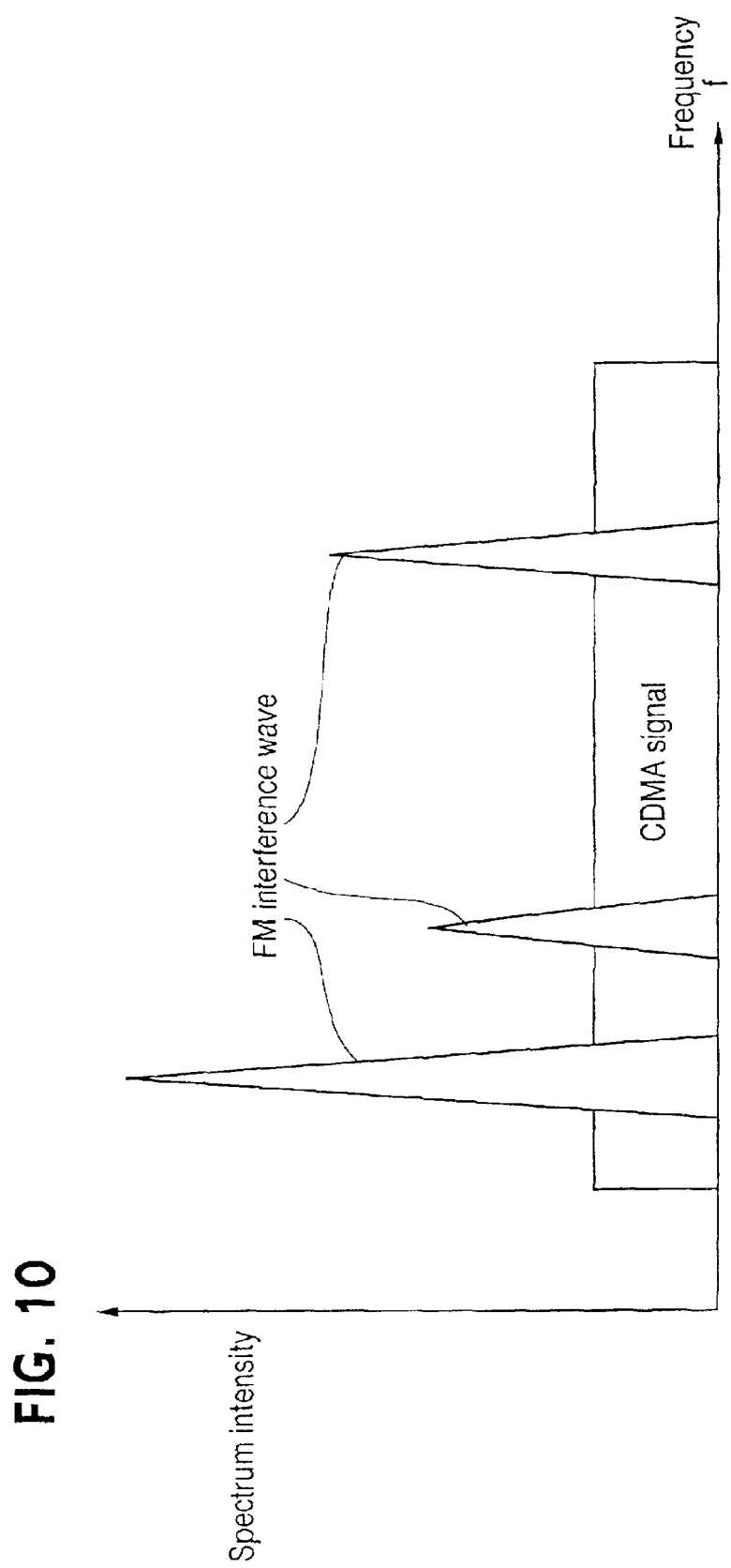
FIG. 10 is an illustration showing spectrums of reception signals including wide-band diffusion signals and narrow-band interference signals according to the CDMA mode.
Figure 11:
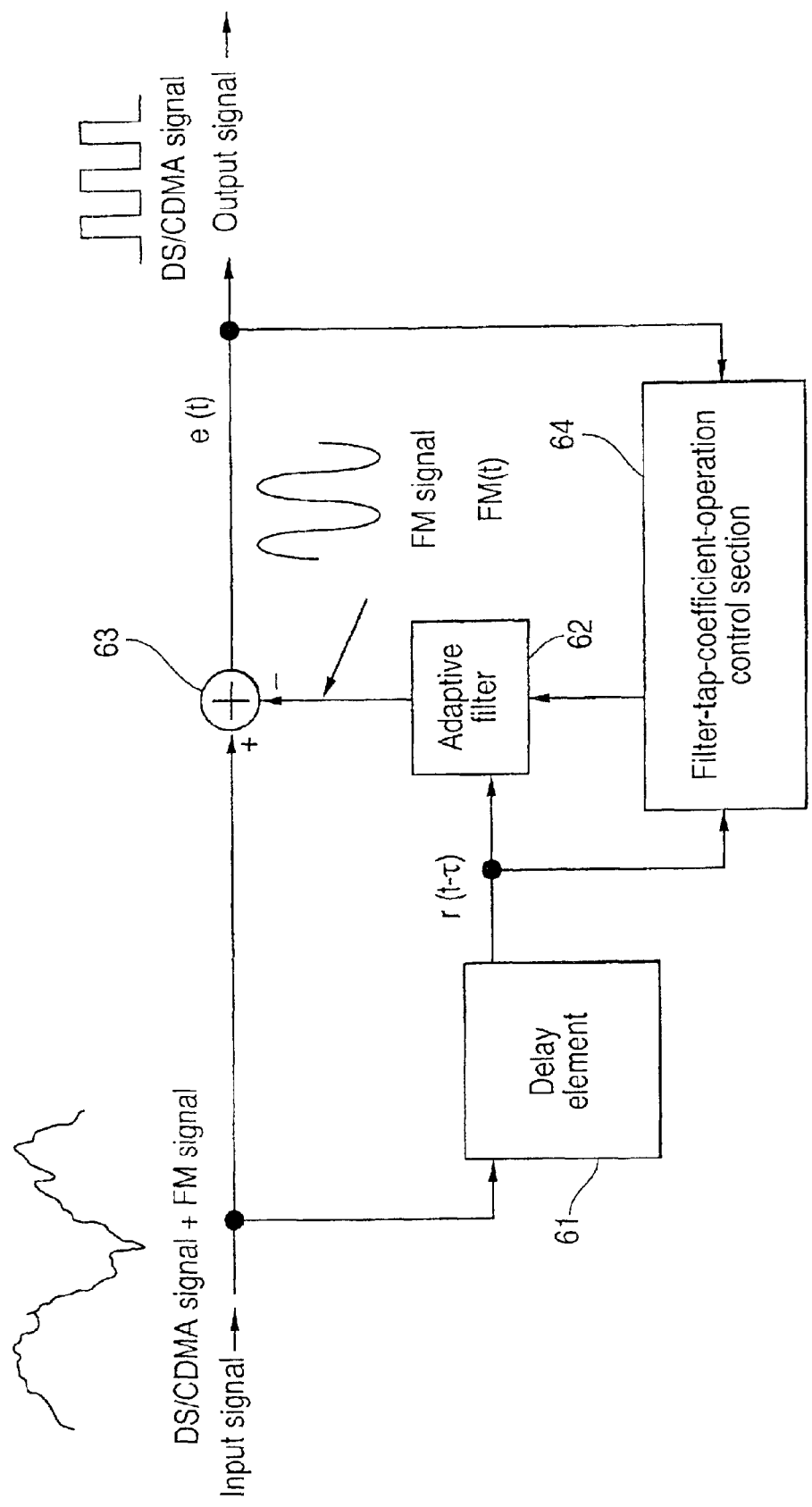
FIG. 11 an illustration showing an interference-signal removing apparatus.
Figure 12:
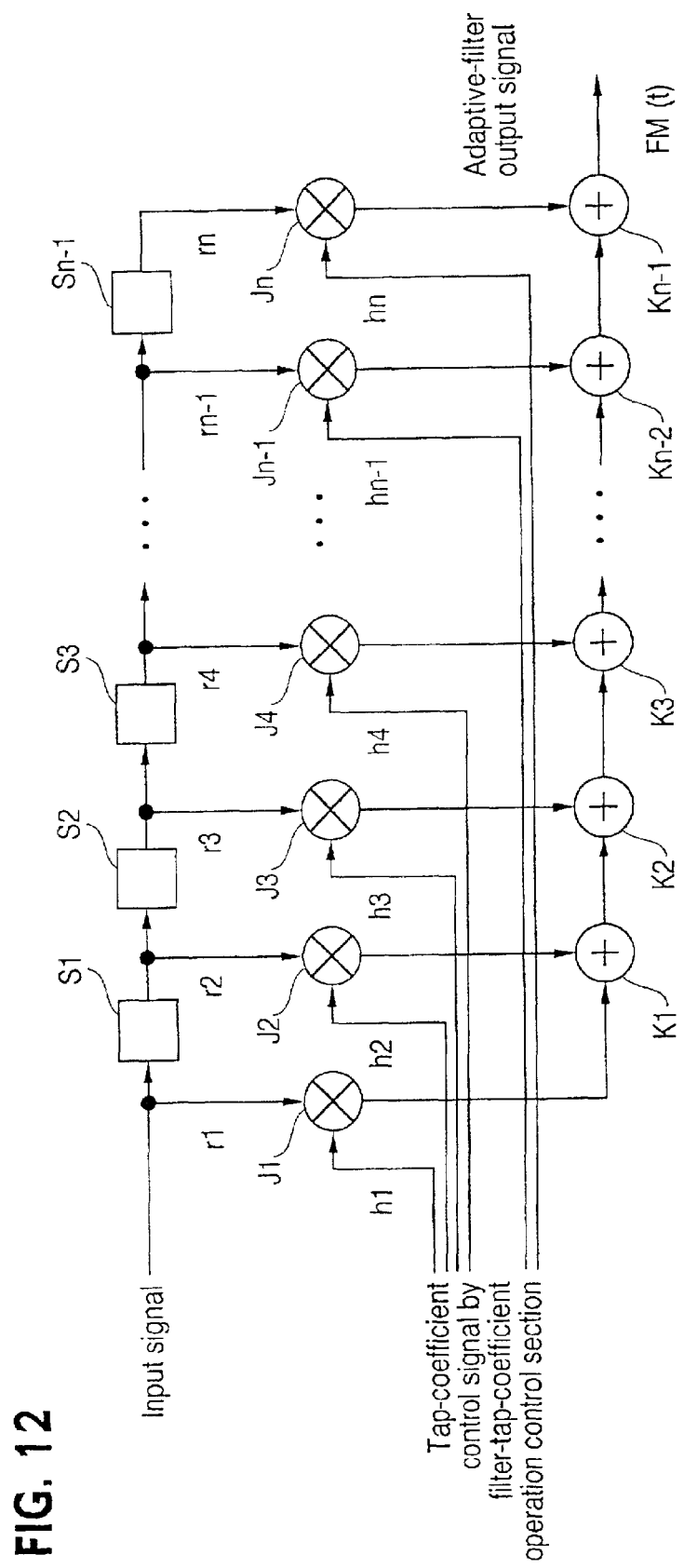
FIG. 12 is an illustration showing a configuration of an adaptive filter.
Figure 16:
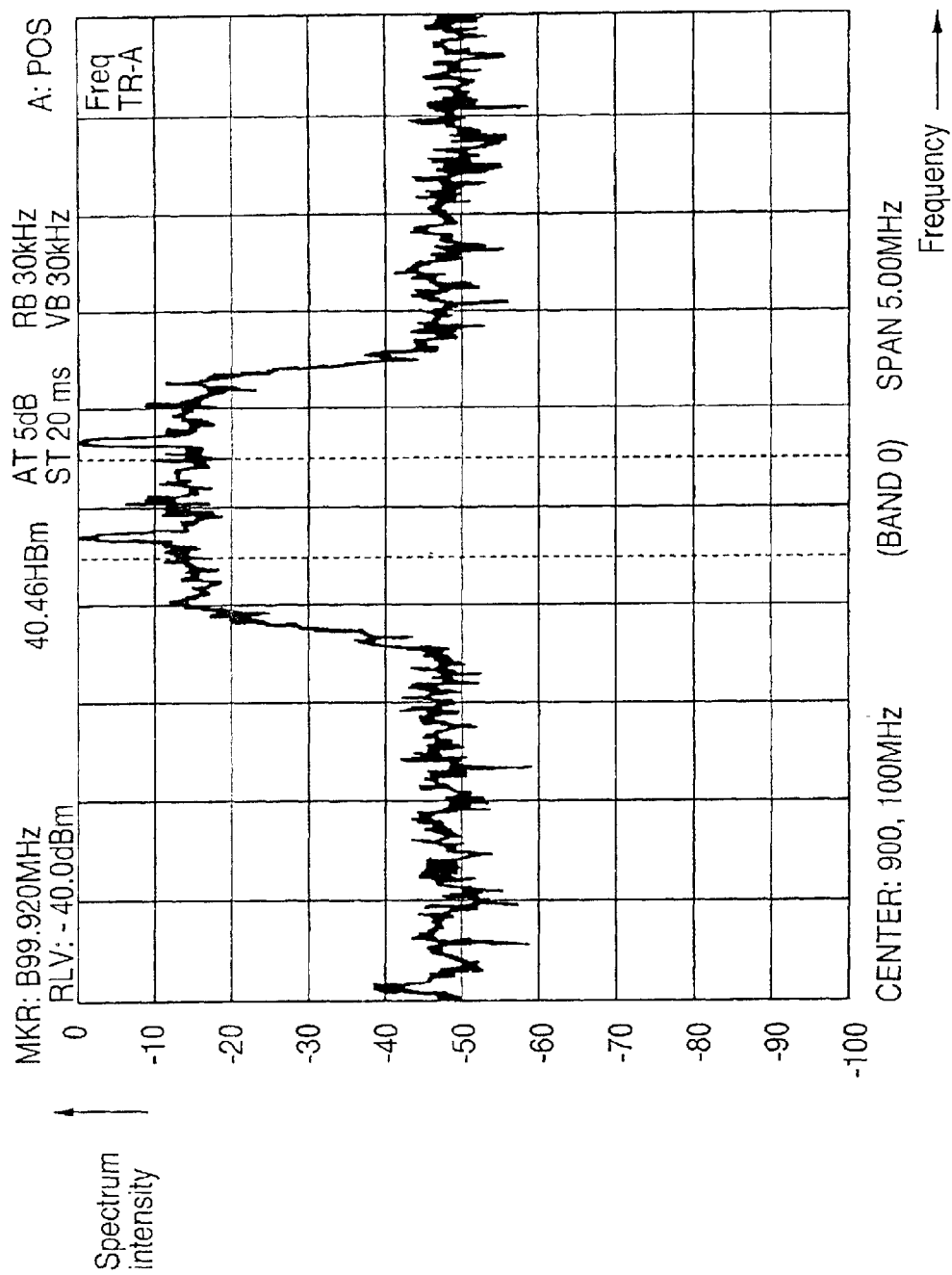
FIG. 16 is an illustration showing a spectrum of a reception signal in which two waves of FM signals interfere with a CDMA signal.
Figure 17:
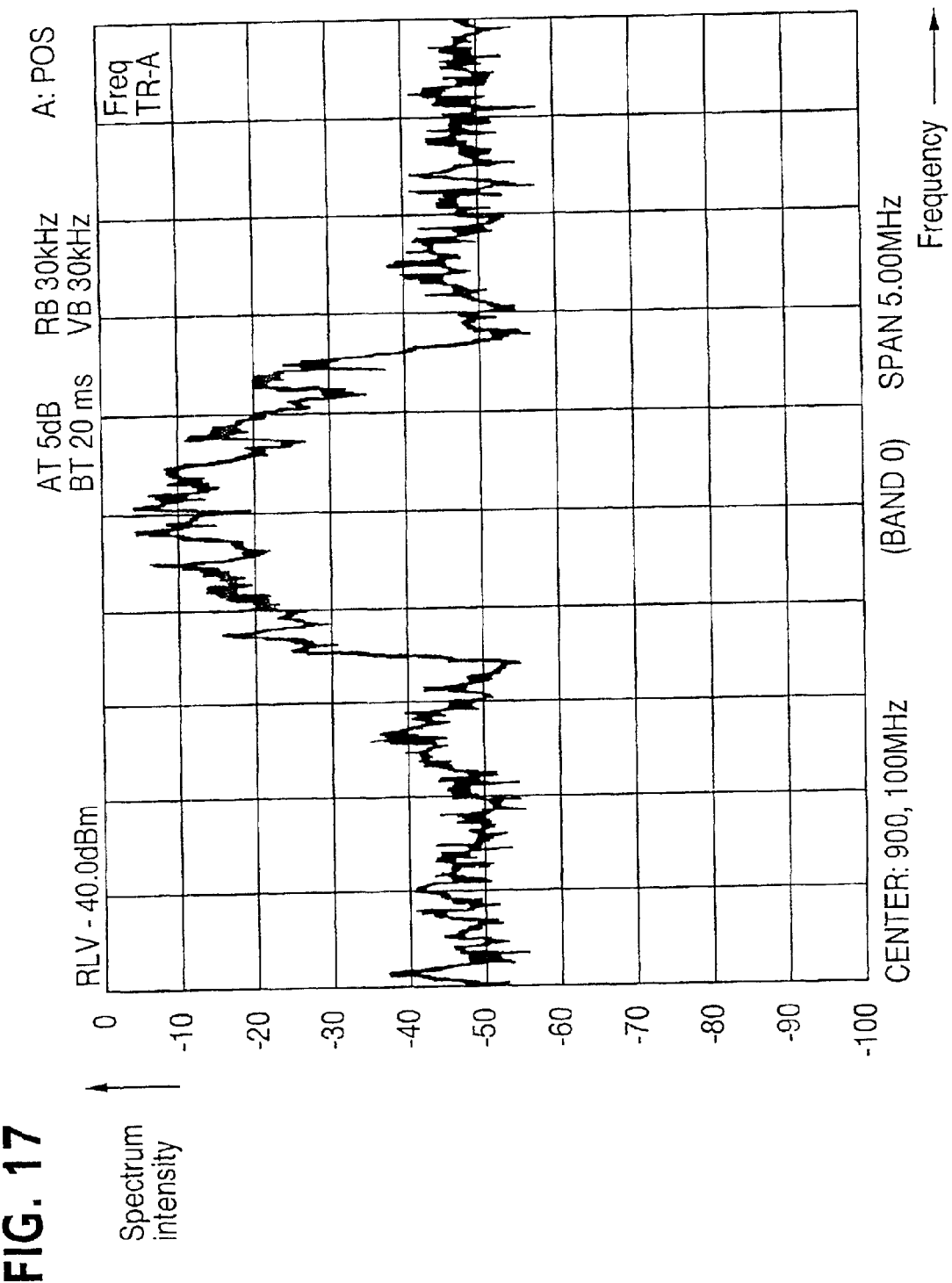
FIG. 17 is an illustration showing a spectrum of a signal output from an interference-signal removing apparatus immediately after start of interference-signal removal.
Figure 18:
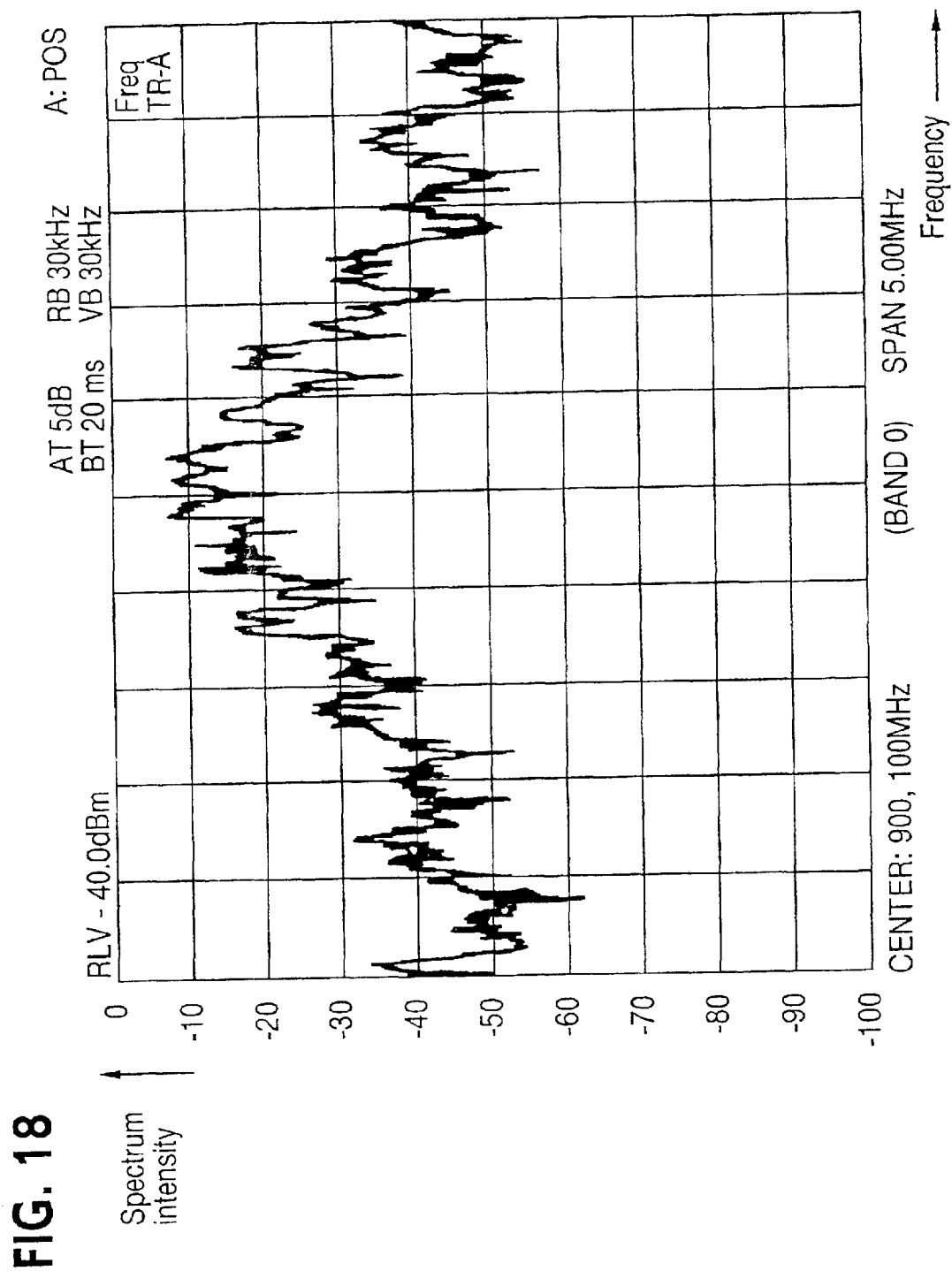
FIG. 18 is an illustration showing a spectrum of a signal output from an interference-signal removing apparatus when some time passes after start of interference-signal removal.
Figure 19:
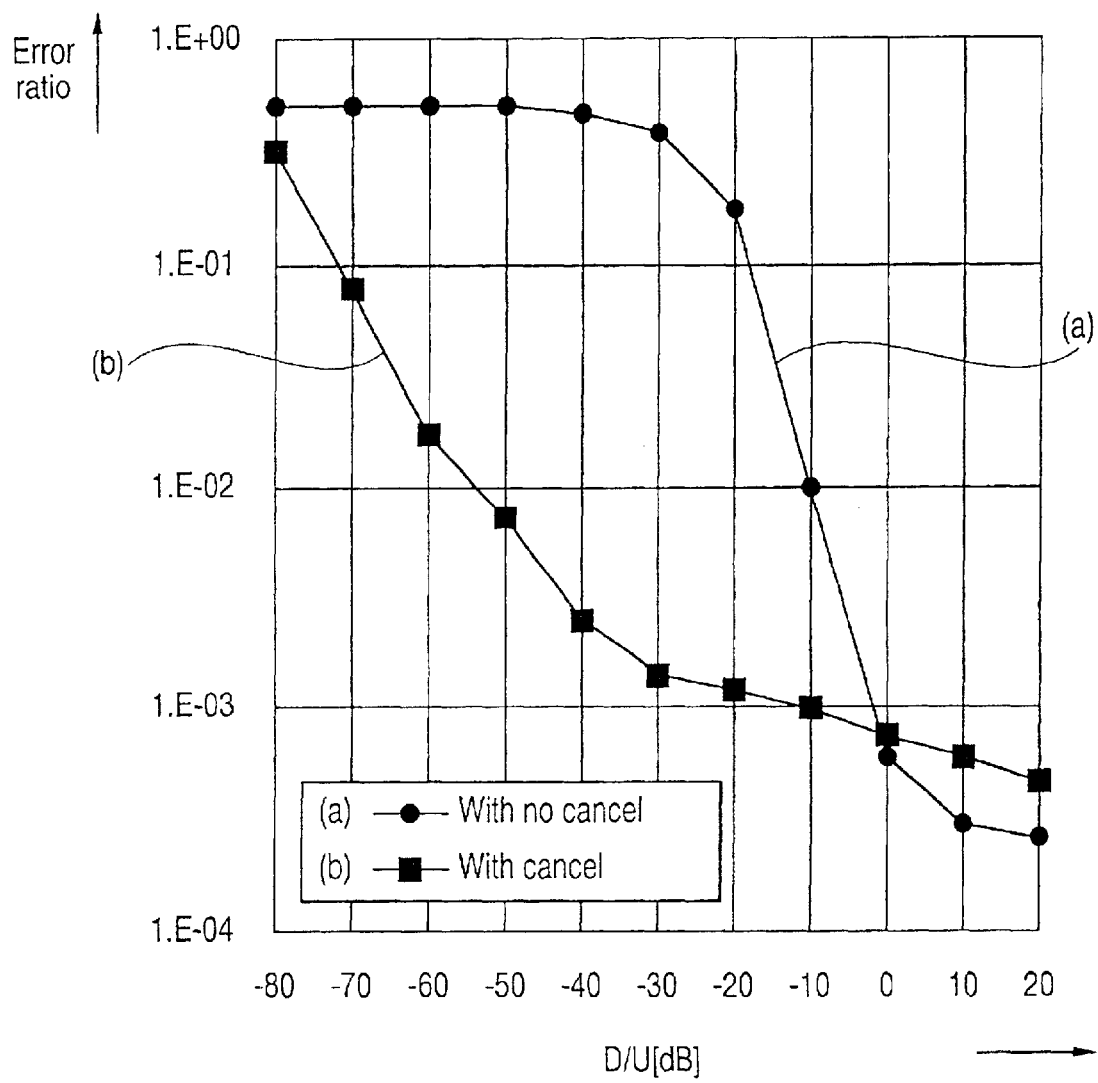
FIG. 19 is an illustration showing interference-signal removal characteristics of an interference-signal removing apparatus.

Moreover, FIG. 6 shows a spectrum of a signal after interference is removed output from the interference-signal removing apparatus of this embodiment shown in FIG. 5 when interference is removed from the signal shown in FIG. 16 (by the interference-signal removing apparatus). For example, FIG. 6 shows a spectrum of a signal output from the interference-signal removing apparatus when the time same as the case shown in FIG. 18 passes after interference-signal removal is started.

As shown in FIG. 6, the interference-signal removing apparatus of this embodiment suppresses that even a wide-band signal is removed when an interference signal is removed.

The abscissa of the graph in FIG. 6 indicates frequency (MHz) and the ordinate of it indicates spectrum intensity of signal.

Moreover, in the case of actual operation, a considerably long time is necessary from the time when signal components having a small power are accumulated up to the time when the components are output to the adaptive filter 42 (interference-signal extraction section 11) as data. Therefore, it is possible to obtain an advantage enough to suppress the interference signal amount to be extracted without performing multiplication of the control coefficient $\alpha$ whenever updating the filter-tap-coefficient series (interference-signal estimation coefficient) h'(t+1). Therefore, it is also possible to realize a configuration in which multiplication of the control coefficient $\alpha$ every predetermined number of updates without performing the multiplication of the control coefficient $\alpha$ whenever updating the estimation operation of an interference signal. The above configuration makes it possible to reduce the size or power consumption of hardware.

Moreover, by keeping the value of the control coefficient $\alpha$ constant and changing cycles of the multiplication of the control coefficient $\alpha$, it is possible to control the interference signal amount to be extracted. An example of the above control method is described below.

In the case of this embodiment, it is assumed that the number of (digital) input bits of the reception signal r(t) is 16, the number of bits of the filter-tap-coefficient series (interference-signal estimation coefficient) h'(t+1) input to the adaptive filter 42 (interference-signal extraction section 11) is 16, and the number of bits of an arithmetic operation element used to compute the filter-tap-coefficient series (interference-signal estimation coefficient) h'(t+1) is 32. Moreover, in the case of this embodiment, it is assumed that the step size parameter (weighting coefficient) $\mu$ shown in the expression 5 is set to 0.001.

The extraction-amount control section 46 (estimation-accuracy control section 14) of this embodiment detects the power difference between a wide-band desired signal and a narrow-band interference signal included in an input reception signal r(t) by spectrum-analyzing the reception signal r(t) and controls the cycle of the multiplication of the control coefficient $\alpha$ performed by the multiplier 45 as described in the following Items (1) to (6) in accordance with the detected power difference.

(1) When the power difference between a wide-band signal and a narrow-band interference signal is 5 dB or more, control is made so that no interference signal is removed (for example, the control coefficient $\alpha$ is set to 0).

(2) When the power difference between a wide-band signal and a narrow-band interference signal is kept within ±5 dB, control is made so that the multiplication of the control coefficient $\alpha$ is performed each time.

(3) When the power difference between a wide-band signal and a narrow-band interference signal is kept in a range of −5 to −15 dB, control is made so that the multiplication of the control coefficient α is performed once every 10 times of update.

(4) When the power difference between a wide-band signal and a narrow-band interference signal is kept in a range of −15 to −25 dB, control is made so that the multiplication of the control coefficient α is performed once every 100 times of update.

(5) When the power difference between a wide-band signal and a narrow-band interference signal is kept in a range of −25 to −35 dB, control is made so that the multiplication of the control coefficient α is performed once every 1,000 times of update.

(6) When the power difference between a wide-band signal and a narrow-band interference signal is −35 dB or more, control is made so that the interference signal amount to be extracted is not controlled (not suppressed).

By controlling the cycle of the multiplication of the control coefficient α, it is realized that a signal component having a comparatively large power is extracted and removed as an interference signal component while a signal component having a comparatively small power is not estimated as an interference signal or the interference signal amount to be extracted is decreased even if the signal component is estimated.

Moreover, when a narrow-band interference signal is not a signal according to the FHSS mode or TDMA mode, that is, the signal is not a signal whose frequency or power is suddenly changed, it is unnecessary to follow the change of the interference signal at a high speed and remove interference. Therefore, it is possible to completely remove continuous narrow-band interference signals even by using a configuration of performing update of the estimation operation of an interference signal once every 256 samples without performing update of the estimation operation of the interference signal {update of the filter-tap-coefficient series (interference-signal estimation coefficient) h'(t+1) every time.

In the case of the above configuration, though the interference-signal removal capacity may be slightly deteriorated, the deterioration value is approx. 5 dB at most. Therefore, in the case of the above configuration, the interference-signal removal capacity is hardly deteriorated and it is possible to greatly reduce the operational throughput for update and thereby, obtain a large advantage that the size and power consumption of hardware can be reduced.

Moreover, it is possible to adaptively remove interference by decelerating the cycle of the estimation operation of the interference signal in the case of a signal in which a narrow-band interference signal is continued (signal whose frequency and power are slowly changed) like a signal according to the FDMA mode, FM mode, or AM mode while accelerating the cycle in the case of a signal in which the frequency and power of an interference signal are suddenly changed like a signal according to the FHSS mode or TDMA mode in accordance with the property of the interference signal.

Furthermore, it is possible to obtain the advantage same as the above by multiplying the reception signal r(t) input to the filter-tap-coefficient-operation control section 44 (interference-signal estimation section 13) and used to compute the filter-tap-coefficient series (interference-signal estimation coefficient) h'(t+1) or the reception signal e(t) after interference is removed by the control coefficient α.

As described above, when estimating and extracting a narrow-band interference signal included in input signals, the interference-signal removing apparatus of this embodiment multiples the last-time interference-signal estimation coefficient (filter-tap-coefficient series) h'(t) used for the above estimation by the control coefficient α and controls the interference signal amount to be extracted. Therefore, it is possible to perform interference removal corresponding to each interference signal and improve the quality of an input signal (wide-band signal) after interference is removed.

Moreover, the multiplication of the control coefficient α makes it possible to obtain an advantage that the value of the interference-signal estimation coefficient (filter-tap coefficient series) h'(t+1) of a frequency band having no correlation is gradually decreased when an interference signal included in the input signal r(t) suddenly disappears or the frequency of the interference signal is slowly changed. Therefore, it is possible to accelerate the recovery time of a dent of a band due to the fact that a wide-band signal is removed by the remaining interference-signal estimation coefficient (filter-tap-coefficient series) h'(t+1) compared to the case in which multiplication of the control coefficient α is not performed and thereby, it is possible to improve the characteristic of the wide-band signal.

Furthermore, by using the control coefficient α and thereby suppressing the interference signal amount to be extracted, it is possible to prevent a signal component containing a wide-band signal and having a small power from being extracted. Therefore, it is possible to suppress that the signal component of a wide-band signal is extracted due to the influence of inter-code interference by a band-restriction filter and thereby, suppress that the wide-band signal is removed.

In the case of this embodiment, extraction means of the present invention is constituted of the interference-signal extraction section 11 (or adaptive filter 42), removal means of the present invention is constituted of the synthesizer 12 (or the subtracter 43), extraction control means of the present invention is constituted of the interference-signal estimation section 13 (or the filter-tap-coefficient-operation control section 44), and extraction-amount suppression means of the present invention is constituted of the estimation-accuracy control section 14 (or the extraction-amount control section 46 or multiplier 45).

Moreover, in the case of this embodiment, the (reception) input signal value r(t) corresponds to an input signal value of the present invention, the input signal series u(t) shown in the expression 1 corresponds to an input vector of the present invention, the interference-signal estimation signal (filter-tap-coefficient control signal) hi shown in the expression 2 corresponds to a control value of the present invention, and the interference-signal estimation coefficient (filter-tap-coefficient series) h(t) corresponds to a control vector of the present invention.

Furthermore, in the case of this embodiment, the above control coefficient α corresponds to a control coefficient (to be multiplied by the last-time control vector) of the present invention.

Next, an interference-signal removing apparatus of fifth embodiment of the present invention is described below.

For this embodiment, a case of transmitting a vide-information signal is discussed by considering the multimedia communication performed in accordance with a future communication mode. In this case, when a receiver receives signals including the video-information signal, it is necessary for the receiver to remove an interference signal from reception signals in a mode in which a necessary video-information signal (such as color signal or the like) is not removed. Therefore, the interference-signal removing apparatus of this embodiment set to a receiver for receiving the above video-information signal is previously set so that the interference-signal removal in which the video-information signal is not removed is performed.

Because the interference-signal removing apparatus of this embodiment has the same configuration as the apparatus shown in FIG. 2, this embodiment is described by referring to FIG. 2 for convenience' sake of description.

As shown in FIG. 2, the interference-signal removing apparatus of this embodiment is provided with an interference-signal extraction section 11, a synthesizer 12, an interference-signal estimation section 13, and an estimation-accuracy control section 14. Symbol t denotes time.

In this case, configurations and operations of the interference-signal extraction section 11 and synthesizer 12 are the same as those shown for the first embodiment.

The interference-signal estimation section 13 of this embodiment calculates the interference-signal estimation coefficient h'(t+1) according to an interference-signal estimation result in accordance with the control by an estimation-accuracy control section 14 to be described later and outputs the interference-signal estimation coefficient h'(t+1) to the interference-signal extraction section 11.

The estimation-accuracy control section 14 inputs a reception signal r(t) and controls the processing performed by the interference-signal estimation section 13 so that the amount of interference signal V(t) to be extracted by the interference-signal extraction section 11 is suppressed when the power of an interference signal included in the reception signal r(t) is comparatively small in a preset mode.

Specifically, while a video-information signal is received, the estimation-accuracy control section 14 of this embodiment performs control so that an interference signal included in the reception signal r(t) is extracted and removed by expecting that the video-information signal is not removed instead of performing the normal interference-signal removal (when the video-information signal is not received). To realize the above mentioned, in the case of this embodiment, the synthesizer 12 for removing an interference signal is provided with storage means (such as a memory) for storing the data expecting a video-information signal to detect the video-information signal by referring to the reception signal e(t) after interference is removed when synthesizing the reception signal r(t) and the interference signal V(t) output from the interference-signal extraction section 11.

The configuration of the interference-signal removing apparatus of this embodiment makes it possible to detect (only) a necessary video-information signal without complicating a circuit configuration.

Therefore, the interference-signal removing apparatus of this embodiment makes it possible to obtain a video-information signal having a preferable quality as the mode of a receiver for the multimedia age.

In this case, the configuration of the interference-signal removing apparatus of this embodiment is not restricted to the above configuration. It is permitted to use any configuration. Specifically, it is possible to apply an interference-signal removing apparatus of the present invention to an apparatus having the configuration shown in FIG. 11, 13, 14, or 15 including the configuration shown for the above embodiment.

Moreover, the applicable field of an interference-signal removing apparatus of the present invention is not restricted to the field shown above. It is possible to apply the present invention to various fields. Specifically, not restricted to the CDMA mode receiver, the present invention can be applied to a receiver of a base-station system, mobile-station system or relay-station system using various communication modes.

Furthermore, it is permitted that a configuration in which a processor (such as a CPU, MPU, or DSP) is controlled by executing a control program stored in a ROM or the like is used in the hardware resource provided with the processor or a memory as various processings performed by an interference-signal removing apparatus of the present invention or that each functional means for executing the processings is constituted as an independent hardware circuit.

Furthermore, the present invention ca be regarded as a computer-readable recording medium such as a floppy disk or CD-ROM storing the above control program and the processing of the present invention can be executed by inputting a control program from the recording medium to a computer and making a processor execute the program.

ADVANTAGES OF THE INVENTION

As described above, when removing a narrow-band interference signal from input signals including a wide-band desired signal and the narrow-band interference signal, an interference-signal removing apparatus of the present invention realizes extracting interference signals included in the input signals by suppressing the interference signal amount to be extracted in accordance with the input signals and removing the extracted interference signals from the input signals by restricting an effective word length and using a control coefficient. Therefore, it is possible to suppress that even desired signals are removed from input signals by a simple configuration and thereby, improve the quality of input signals (desired signals) after interference is removed compared to a conventional case.

What is claimed is:

1. An interference-signal removing apparatus for removing narrow-band interference signals from input signals including wide-band desired signals and the narrow-band interference signals, comprising:

extraction means for extracting the interference signals from the input signal;

removal means for removing the extracted interference signals from the input signal;

extraction control means for controlling extraction of the interference signals by the extraction means in accordance with a removal result of the removal means; and extraction-amount suppression means for suppressing the interference signal amount to be extracted by the extraction means in accordance with the input signal; wherein the extraction control means computes a control vector constituted of a plurality of digital control values for controlling extraction of interference signals and outputs the control vector to the extraction means, the extraction means extracts the inner product of an input vector constituted of a plurality of input signal values and the control vector output from the extraction control means as an extracted interference signal, and the extraction-amount suppression means restricts the effective word length of a digital control value constituting the control vector output from the extraction control means and suppresses the interference signal amount to be extracted by the extraction means.

2. An interference-signal removing apparatus for removing narrow-band interference signals from input signals including wide-band desired signals and the narrow-band interference signals, comprising:

extraction means for extracting the interference signals from the input signal;

removal means for removing the extracted interference signals from the input signal;

extraction control means for controlling extraction of the interference signals by the extraction means in accordance with a removal result of the removal means; and extraction-amount suppression means for suppressing the interference signal amount to be extracted by the extraction means in accordance with the input signal; wherein the extraction control means computes a control vector constituted of a plurality of control values for controlling extraction of interference signals in accordance with a digital operator and outputs the control vector to the extraction means, the extraction means extracts the inner product of an input vector constituted of a plurality of input signal values and the control vector output from the extraction control means as an extracted interference signal, and the extraction-amount suppression means restricts the effective word length of a digital operator used by the extraction control means and suppresses the interference signal amount to be extracted by the extraction means.

3. An interference-signal removing apparatus for removing narrow-band interference signals from input signals including wide-band desired signals and the narrow-band interference signals, comprising:

extraction means for extracting the interference signals from the input signal;

removal means for removing the extracted interference signals from the input signal;

extraction control means for controlling extraction of the interference signals by the extraction means in accordance with a removal result of the removal means; and extraction-amount suppression means for suppressing the interference signal amount to be extracted by the extraction means in accordance with the input signal; wherein the extraction control means computes a control vector constituted of a plurality of control values for controlling extraction of interference signals and outputs the control vector to the extraction means, the extraction means extracts the inner product of an input vector constituted of a plurality of input signal values and the control vector output from the extraction control means as an extracted interference signal, and the extraction-amount suppression means multiplies the control vector output from the extraction control means by a control coefficient of less than 1 to suppress the interference signal amount to be extracted by the extraction means.

4. An interference-signal removing apparatus for removing a narrow-band interference signal from input signals including wide-band desired signals and the narrow-band interference signals, comprising:

extraction means for extracting the interference signal from the input signal;

removal means for removing the extracted interference signal from the input signal;

extraction control means for controlling extraction of the interference signal by the extraction means in accordance with a removal result of the removal means; and extraction-amount suppression means for suppressing the interference signal amount to be extracted by the extraction means in accordance with the input signal; wherein the extraction control means updates a control vector constituted of a plurality of control values for controlling extraction of interference signals by using the last-time control vector and outputs the updated result to the extraction means, the extraction means extracts the inner product of an input vector constituted of a plurality of input signal values and the control vector output from the extraction control means as an extracted interference signal, and the extraction-amount suppression means multiplies the last-time vector used to update a control vector by the extraction control means by a control coefficient of less than 1 to suppress the interference signal amount to be extracted.

5. The interference-signal removing apparatus according to claim 3, wherein the extraction-amount suppression means controls the value of a control coefficient in accordance with an input signal and performs the multiplication of a control vector and a control coefficient at a predetermined time interval to suppress the interference signal amount to be extracted by the extraction means.

6. The interference-signal removing apparatus according to claim 4, wherein the extraction-amount suppression means controls the value of a control coefficient in accordance with an input signal and performs the multiplication of a control vector and a control coefficient at a predetermined time interval to suppress the interference signal amount to be extracted by the extraction means.

7. The interference-signal removing apparatus according to claim 3, wherein the extraction-amount suppression means performs the multiplication of a control vector and a control coefficient at a predetermined cycle by keeping the control coefficient constant to suppress the interference signal amount to be extracted by the extraction means.

8. The interference-signal removing apparatus according to claim 4, wherein the extraction-amount suppression means performs the multiplication of a control vector and a control coefficient at a predetermined cycle by keeping the control coefficient constant to suppress the interference signal amount to be extracted by the extraction means.

9. The interference-signal removing apparatus according to claim 1, wherein the extraction control means computes a control vector at a predetermined time interval.

10. The interference-signal removing apparatus according to claim 2, wherein the extraction control means computes a control vector at a predetermined time interval.

11. The interference-signal removing apparatus according to claim 3, wherein the extraction control means computes a control vector at a predetermined time interval.

12. The interference-signal removing apparatus according to claim 4, wherein the extraction control means updates a control vector at a predetermined time interval.

13. The interference-signal removing apparatus according to claim 1, wherein the extraction-amount suppression means suppresses the interference signal amount to be extracted by the extraction means in a mode preset in accordance with an input signal.

14. The interference-signal removing apparatus according to claim 2, wherein the extraction-amount suppression means suppresses the interference signal amount to be extracted by the extraction means in a mode preset in accordance with an input signal.

15. The interference-signal removing apparatus according to claim 3, wherein the extraction-amount suppression means suppresses the interference signal amount to be extracted by the extraction means in a mode preset in accordance with an input signal.

16. The interference-signal removing apparatus according to claim 4, wherein the extraction-amount suppression means suppresses the interference signal amount to be extracted by the extraction means in a mode preset in accordance with an input signal.

17. The interference-signal removing apparatus according to claim 1, wherein the extraction-amount suppression means suppresses the interference signal amount to be extracted by the extraction means in accordance with the power difference between a desired signal and an interference signal included in input signals.

18. The interference-signal removing apparatus according to claim 2, wherein the extraction-amount suppression means suppresses the interference signal amount to be extracted by the extraction means in accordance with the power difference between a desired signal and an interference signal included in input signals.

19. The interference-signal removing apparatus according to claim 3, wherein the extraction-amount suppression means suppresses the interference signal amount to be extracted by the extraction means in accordance with the power difference between a desired signal and an interference signal included in input signals.

20. The interference-signal removing apparatus according to claim 4, wherein the extraction-amount suppression means suppresses the interference signal amount to be extracted by the extraction means in accordance with the power difference between a desired signal and an interference signal included in input signals.

21. The interference-signal removing apparatus according to claim 1, wherein the extraction-amount suppression means suppresses the interference signal amount to be extracted by the extraction means in accordance with the power of a desired signal included in input signals.

22. The interference-signal removing apparatus according to claim 2, wherein the extraction-amount suppression means suppresses the interference signal amount to be extracted by the extraction means in accordance with the power of a desired signal included in input-signals.

23. The interference-signal removing apparatus according to claim 3, wherein the extraction-amount suppression means suppresses the interference signal amount to be extracted by the extraction means in accordance with the power of a desired signal included in input signals.

24. The interference-signal removing apparatus according to claim 4, wherein the extraction-amount suppression means suppresses the interference signal amount to be extracted by the extraction means in accordance with the power of a desired signal included in input signals.

25. An interference-signal removing apparatus for removing narrow-band signals from input signals including wide-band desired signals and said narrow-band interference signals, wherein the interference signal amount to be extracted included in input signals is suppressed in accordance with said input signals and extracted interference signals are removed from said input signals.

26. An interference-signal removing apparatus for removing narrow-band interference signals from input signals including wide-band desired signals and the narrow-band interference signals, comprising:

extraction means for extracting interference signals from input signals;

removal means for removing extracted interference signals from input signals;

extraction control means for controlling extraction of interference signals by extraction means in accordance with a removal result of removal means; and extraction-amount suppression means for suppressing the interference signal amount to be extracted by extraction means in accordance with input signals.

27. The interference-signal removing apparatus according to claim 26, wherein extraction-amount suppression means suppresses the interference signal amount to be extracted by extraction means in accordance with the power difference between desired signals and interference signals included in input signals.

28. The interference-signal removing apparatus according to claim 26, wherein extraction-amount suppression means suppresses the interference signal amount to be extracted by extraction means in accordance with the power of desired signals included in input signals.

* * * * *